(12) United States Patent
Hu et al.

(10) Patent No.: US 11,724,700 B2
(45) Date of Patent: Aug. 15, 2023

(54) INTELLIGENT DRIVING METHOD AND INTELLIGENT DRIVING SYSTEM

(71) Applicant: Huawei Technologies Co., Ltd., Shenzhen (CN)

(72) Inventors: Weilong Hu, Dongguan (CN); Yabing Zhou, Shenzhen (CN); Huawei Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 242 days.

(21) Appl. No.: 17/029,561

(22) Filed: Sep. 23, 2020

(65) Prior Publication Data
US 2021/0009156 A1    Jan. 14, 2021

Related U.S. Application Data

(63) Continuation of application No. PCT/CN2019/095943, filed on Jul. 15, 2019.

(30) Foreign Application Priority Data

Sep. 12, 2018   (CN) .......................... 201811062799.1
Jul. 12, 2019   (CN) .......................... 201910630930.8

(51) Int. Cl.
*B60W 40/04*   (2006.01)
*B60W 60/00*   (2020.01)
(Continued)

(52) U.S. Cl.
CPC ............ *B60W 40/04* (2013.01); *B60W 40/06* (2013.01); *B60W 50/14* (2013.01);
(Continued)

(58) Field of Classification Search
CPC .......... B60W 60/001; B60W 60/0061; B60W 40/04; B60W 40/06; B60W 50/14; B60W 2552/00
See application file for complete search history.

(56) References Cited

U.S. PATENT DOCUMENTS 9,290,174 B1      3/2016  Zagorski
11,204,605 B1 *  12/2021  Allais ................. G05D 1/0088
(Continued)

FOREIGN PATENT DOCUMENTS

CN    103247186 A    8/2013
CN    103778443 A    5/2014
(Continued)

OTHER PUBLICATIONS

Bonnin, S., et al., "General Behavior Prediction by a Combination of Scenario-Specific Models", IEEE Transactions on Intelligent Transportation Systems, vol. 15, No. 4, Aug. 2014, 11 pages.
(Continued)

*Primary Examiner* — Peter D Nolan
*Assistant Examiner* — Mikko Okechukwu Obioha
(74) *Attorney, Agent, or Firm* — Conley Rose, P.C.

(57) ABSTRACT

An intelligent driving method comprising: obtaining feature parameters of a vehicle at a current moment and a road attribute of a driving scenario of the vehicle in a preset future time period; comparing the feature parameters at the current moment with feature parameters of a standard scenario in a scenario feature library; comparing the road attribute of the driving scenario of the vehicle in the preset future time period with a road attribute of the standard scenario in the scenario feature library; determining a total similarity of each scenario class to a driving scenario of the vehicle at the current moment based on comparing results; determining, as the driving scenario at the current moment, a first scenario (Continued)

class with a highest total similarity in N scenario classes; and controlling, based on the determining result, the vehicle to perform intelligent driving.

20 Claims, 15 Drawing Sheets

(51) Int. Cl.
*B60W 40/06* (2012.01)
*B60W 50/14* (2020.01)
*G06V 10/764* (2022.01)
*G06V 10/80* (2022.01)
*G06V 20/56* (2022.01)

(52) U.S. Cl.
CPC ...... *B60W 60/001* (2020.02); *B60W 60/0061* (2020.02); *G06V 10/764* (2022.01); *G06V 10/80* (2022.01); *G06V 20/56* (2022.01); *B60W 2552/00* (2020.02)

(56) References Cited

U.S. PATENT DOCUMENTS

| | | | |
|---|---|---|---|
| 2014/0142799 A1* | 5/2014 | Ferguson | G05D 1/00 701/1 |
| 2015/0291146 A1 | 10/2015 | Prakah-Asante et al. | |
| 2017/0249504 A1* | 8/2017 | Martinson | G06V 40/103 |
| 2017/0277188 A1* | 9/2017 | Xu | G05D 1/0246 |
| 2018/0074501 A1* | 3/2018 | Boniske | B60W 50/04 |
| 2018/0086344 A1 | 3/2018 | Zhu et al. | |
| 2018/0127000 A1* | 5/2018 | Jiang | G06N 20/00 |
| 2018/0173971 A1* | 6/2018 | Jia | G06N 3/0454 |
| 2019/0187710 A1* | 6/2019 | Funayama | G01C 21/3602 |
| 2019/0261184 A1 | 8/2019 | Xu et al. | |
| 2022/0215378 A1* | 7/2022 | Dhama | G07C 5/0816 |

FOREIGN PATENT DOCUMENTS

| | | |
|---|---|---|
| CN | 105023451 A | 11/2015 |
| CN | 105488534 A | 4/2016 |
| CN | 105539432 A | 5/2016 |
| CN | 105719362 A | 6/2016 |
| CN | 105954048 A | 9/2016 |
| CN | 107272687 A | 10/2017 |
| CN | 107609502 A | 1/2018 |
| CN | 107609602 A | 1/2018 |
| CN | 107697070 A | 2/2018 |
| CN | 108139884 A | 6/2018 |
| JP | 2018192954 A | 12/2018 |
| KR | 20120075856 A | 7/2012 |
| WO | 2018200026 A1 | 11/2018 |

OTHER PUBLICATIONS

Chenhao Wang et al: "Predictive Lane Detection by Interaction with Digital Road Map," Journal of Information Processing, Jan. 31, 2012, pp. 287-296, XP055502845, 10 pages.

* cited by examiner

| Navigation | Notification: A driving scenario is about to be switched to a junction scenario class | Manual vehicle control button |
|---|---|---|
| | | Current speed: 30 km/h |
| | Huizhou avenue — Huaihe road / Changjiang road | Remaining fuel volume: 79% |
| | | Current driving scenario: structured urban traffic jam-free scenario class |
| | | 19:30 2018/4/11 |

FIG. 7B

INTELLIGENT DRIVING METHOD AND INTELLIGENT DRIVING SYSTEM

CROSS-REFERENCE TO RELATED APPLICATIONS

This application is a continuation of International Patent Application No. PCT/CN2019/095943, filed on Jul. 15, 2019, which claims priority to Chinese Patent Application No. 201910630930.8 filed on Jul. 12, 2019 and Chinese Patent Application No. 201811062799.1 filed on Sep. 12, 2018, all of which are hereby incorporated by reference in their entireties.

TECHNICAL FIELD

This application relates to the field of self-driving technologies, and in particular, to an intelligent driving method and an intelligent driving system.

BACKGROUND

On a basis of an ordinary vehicle, an intelligent driving vehicle further has apparatuses such as an advanced sensor (a radar and a camera), a controller, and an actuator, and implements intelligent information exchange with a person, a vehicle, a road, and the like using an in-vehicle sensing system and an information terminal. In this way, the vehicle can intelligently perceive an ambiance, automatically analyze safe and dangerous statuses of the vehicle, and make the vehicle reach a destination according to a will of a person, to finally replace the person to perform an operation, in order to reduce burden of manned driving.

In other approaches, a general control system of the intelligent driving vehicle collects data of all parts of all subsystems in a unified manner, and then processes the data in a unified manner, to control the intelligent driving vehicle. For example, the general control system may collect and analyze an obtained road ambiance video image and establish urban road scenario, rural road scenario, and highway scenario recognition libraries, perform feature extraction and convolution training on a sample image in the library using a deep convolutional neural network, to obtain a convolutional neural network classifier, and finally input a real-time perceived picture into the convolutional neural network classifier for recognition, to identify a driving scenario of the current vehicle.

However, in the foregoing manner of classifying scenarios using the convolutional neural network classifier, a real-time perceived image is likely to be unclear in a case such as a rainy day, a foggy day, or an undesired lighting condition. This reduces accuracy of recognizing the real-time perceived picture input into the convolutional neural network classifier. Consequently, a current driving scenario cannot be accurately recognized, and intelligent driving of the vehicle is affected.

SUMMARY

Embodiments of this application provide an intelligent driving method and an intelligent driving system, to resolve an existing problem that intelligent driving of a vehicle is affected because a current driving scenario cannot be accurately recognized.

To achieve the foregoing objectives, the embodiments of this application provide the following technical solutions.

According to a first aspect, an embodiment of this application provides an intelligent driving method, where the method includes: obtaining feature parameters (structured semantic information, a road attribute, and a traffic status spectrum) of a vehicle at a current moment and a road attribute of a driving scenario of the vehicle in a preset future time period; comparing the feature parameters at the current moment with feature parameters of a standard scenario in a scenario feature library; comparing the road attribute of the driving scenario of the vehicle in the preset future time period with a road attribute of the standard scenario in the scenario feature library; determining a total similarity of each scenario class in the scenario feature library to a driving scenario of the vehicle at the current moment based on comparing results; determining, as the driving scenario at the current moment, a first scenario class with a highest total similarity in N scenario classes; and controlling a driving status of the vehicle based on the determining result. Based on the method provided in the first aspect, a scenario class of the vehicle at the current moment may be recognized based on three dimensions: the structured semantic information, the road attribute, and the traffic status spectrum, such that information referred in scenario class recognition is more comprehensive and more reliable. This improves accuracy of scenario recognition and implementability of intelligent driving. In addition, the scenario class is recognized based on the structured semantic information instead of a picture, thereby reducing calculation complexity.

With reference to the first aspect, in a first possible implementation of the first aspect, for any scenario in the scenario library, the comparing the feature parameters at the current moment with feature parameters of a standard scenario in a scenario feature library, comparing the road attribute of the driving scenario of the vehicle in the preset future time period with a road attribute of the standard scenario in the scenario feature library, and determining a total similarity of the scenario class based on comparing results includes: comparing the structured semantic information at the current moment with structured semantic information of the standard scenario in the scenario feature library, to obtain a first similarity of the standard scenario; performing combined calculation on first similarities of all standard scenarios belonging to the scenario class, to obtain a first probability of the scenario class; comparing the road attribute at the current moment with the road attribute of the standard scenario in the scenario feature library, to obtain a second similarity of the standard scenario; performing combined calculation on second similarities of all the standard scenarios belonging to the scenario class, to obtain a second probability of the scenario class; comparing the road attribute of the driving scenario of the vehicle in the preset future time period with the road attribute of the standard scenario in the scenario feature library, to obtain a third similarity of the standard scenario; performing combined calculation on third similarities of all the standard scenarios belonging to the scenario class, to obtain a third probability of the scenario class; comparing the traffic status spectrum at the current moment with a traffic status spectrum of the standard scenario in the scenario feature library, to obtain a fourth similarity of the standard scenario; performing combined calculation on fourth similarities of all the standard scenarios belonging to the scenario class, to obtain a fourth probability of the scenario class; and obtaining the total similarity of the scenario class based on the first probability, the second probability, the third probability, and the fourth probability of the scenario class. In this way, a scenario class of the vehicle at the current moment may be recognized based on three dimensions: the structured semantic information, the road attribute, and the traffic status spectrum.

With reference to the first possible implementation of the first aspect, in a second possible implementation of the first aspect, before the comparing the feature parameters at the current moment with feature parameters of a standard scenario in a scenario feature library, and comparing the road attribute of the driving scenario of the vehicle in the preset future time period with a road attribute of the standard scenario in the scenario feature library, the method further includes setting, to 0, a similarity of a standard scenario without real-time structured semantic information in the scenario feature library. In this way, the standard scenario without real-time structured semantic information in the scenario feature library may be filtered out, and does not need to be stored in the scenario feature library, thereby reducing complexity of subsequently comparing structured semantic information.

With reference to any one of the first aspect or the possible implementations of the first aspect, in a third possible implementation of the first aspect, the controlling, based on the determining result, the vehicle to perform intelligent driving includes: determining whether the first scenario class is the same as a scenario class at a previous moment; if the first scenario class is the same as the scenario class at the previous moment, determining whether a current designed operation range of the vehicle matches a designed operation range corresponding to the first scenario class; and if the current designed operation range of the vehicle matches the designed operation range corresponding to the first scenario class, maintaining a current driving status, or if the current designed operation range of the vehicle does not match the designed operation range corresponding to the first scenario class, sending fault alert information. In this way, when the current driving scenario is the same as the driving scenario at the previous moment, and a current driving circumstance of the vehicle can support the vehicle in operating in the current driving scenario, the current driving status may be maintained.

With reference to the third possible implementation of the first aspect, in a fourth possible implementation of the first aspect, the method further includes: if the first scenario class is different from the scenario class at the previous moment, determining whether the current designed operation range of the vehicle matches the designed operation range corresponding to the first scenario class; and if the current designed operation range of the vehicle matches the designed operation range corresponding to the first scenario class, switching the vehicle from a current driving status to a driving status corresponding to the first scenario class; or if the current designed operation range of the vehicle does not match the designed operation range corresponding to the first scenario class, determining whether the current designed operation range of the vehicle matches a designed operation range corresponding to the scenario class at the previous moment, and if the current designed operation range of the vehicle matches the designed operation range corresponding to the scenario class at the previous moment, sending scenario class switching failure information, and maintaining a current driving status, or if the current designed operation range of the vehicle does not match the designed operation range corresponding to the scenario class at the previous moment, sending fault alert information. In this way, when the current driving scenario is different from the driving scenario at the previous moment, the driving status of the vehicle can be intelligently switched, such that the driving status is applicable to the current driving scenario.

With reference to the third possible implementation of the first aspect or the fourth possible implementation of the first aspect, in a fifth possible implementation of the first aspect, after the sending fault alert information, the method further includes: determining whether a driver has taken over the vehicle; and if it is determined that the driver has taken over the vehicle, sending, to a proactive vehicle execution unit of the vehicle, an operation instruction for indicating driving right release, and sending a release notification to the driver, or if it is determined that the driver has not taken over the vehicle, sending, to a proactive vehicle execution unit, an operation instruction for indicating safe pullover. In this way, it can ensure that intelligent driving is terminated only after the driver has taken over the vehicle, thereby improving driving safety and user experience.

With reference to any one of the first aspect or the possible implementations of the first aspect, in a sixth possible implementation of the first aspect, before the controlling, based on the determining result, the vehicle to perform intelligent driving, the method further includes: obtaining an intelligent driving instruction, where the intelligent driving instruction is used to instruct whether to terminate intelligent driving of the vehicle; and if the intelligent driving instruction is used to instruct the vehicle to perform intelligent driving, controlling, based on the determining result, the vehicle to perform intelligent driving; or if the intelligent driving instruction is used to instruct to terminate intelligent driving of the vehicle, sending, to the proactive vehicle execution unit of the vehicle, an operation instruction for indicating driving right release, and sending a release notification to the driver. In this way, intelligent driving can be performed only under instruction of the driver (or a user), thereby improving user experience.

According to a second aspect, this application provides an intelligent driving system, where the intelligent driving system may be a vehicle or a combination of a plurality of modules of a vehicle. The intelligent driving system can implement the intelligent driving method in the foregoing aspects or the foregoing possible designs, and the functions may be implemented by hardware or executing corresponding software by hardware. The hardware or the software includes one or more modules corresponding to the foregoing functions. For example, the intelligent driving system may include: a perception fusion unit configured to obtain feature parameters of a vehicle at a current moment and a road attribute of a driving scenario of the vehicle in a preset future time period, where the feature parameters include structured semantic information, a road attribute, and a traffic status spectrum; a scenario class recognition unit configured to: compare the feature parameters at the current moment with feature parameters of a standard scenario in a scenario feature library, compare the road attribute of the driving scenario of the vehicle in the preset future time period with a road attribute of the standard scenario in the scenario feature library, determine a total similarity of each scenario class in the scenario feature library to a driving scenario of the vehicle at the current moment based on comparing results; and determine, as the driving scenario at the current moment, a first scenario class with a highest total similarity in N scenario classes, where the scenario feature library includes the N scenario classes, each scenario class corresponds to M standard scenarios, each standard scenario corresponds to feature parameters, N is an integer greater than or equal to 1, and M is an integer greater than or equal to 1; and a scenario class switching module configured to control a driving status of the vehicle based on the determining result.

For an implementation of the intelligent driving system, refer to the steps of the intelligent driving method provided in any one of the first aspect or the possible implementations of the first aspect. Details are not described herein again. Therefore, beneficial effects of the intelligent driving system can be the same as beneficial effects of any one of the first aspect or the possible implementations of the first aspect.

According to a third aspect, this application provides an intelligent driving method, where the method is used in an intelligent driving system, the intelligent system is on a vehicle, and the method includes: obtaining feature parameters of the vehicle at a first time and a road attribute of a driving scenario of the vehicle in a preset future time period after the first time, where the feature parameters include structured semantic information, a road attribute, and a traffic status spectrum; selecting a first driving scenario class in a scenario feature library based on the feature parameters of the vehicle at the first time and the road attribute of the driving scenario of the vehicle in the preset future time period; displaying a first prompt, where the first prompt is used to prompt a driver that a driving scenario of the vehicle at the first time is switched to the first driving scenario class; receiving a first instruction, where the first instruction corresponds to the first prompt, and is used to instruct to switch from the driving scenario of the vehicle at the first time to the first driving scenario class; and controlling a driving status of the vehicle based on the first driving scenario class.

In the third aspect, a possible implementation is as follows: The selecting a first driving scenario class in a scenario feature library includes: comparing the feature parameters of the vehicle at the first time with feature parameters of a standard scenario in the scenario feature library; comparing the road attribute of the driving scenario of the vehicle in the preset future time period after the first time with a road attribute of the standard scenario in the scenario feature library; determining a total similarity of each scenario class in the scenario feature library to a driving scenario of the vehicle at a current moment based on comparing results, where the scenario feature library includes N scenario classes, each scenario class corresponds to M standard scenarios, and both N and M are positive integers; determining, as the driving scenario at the first time, a first scenario class with a highest total similarity in the N scenario classes.

In the third aspect, another possible implementation is as follows: After the controlling a driving status of the vehicle based on the first driving scenario class, the method further includes: selecting a second driving scenario class in the scenario feature library as a driving scenario at a second time; displaying a second prompt, where the second prompt is used to request to switch from the driving scenario of the vehicle at the second time to the second driving scenario class; and when no second instruction is received within a preset time, keep controlling, based on the second driving scenario class, the driving status of the vehicle, where the second instruction corresponds to the second prompt, and is used to instruct to switch from the current driving scenario of the vehicle to the second driving scenario class.

In the third aspect, another possible implementation is as follows: After no second response is received within the preset time, the method includes: determining that a designed operation range of the vehicle at the second time does not match a designed operation range corresponding to the first scenario class; and sending fault alert information.

In the third aspect, another possible implementation is as follows: After the sending fault alert information, the method further includes: determining whether the driver has taken over the vehicle; and if it is determined that the driver has taken over the vehicle, sending an operation instruction for indicating driving right release, and sending a release notification to the driver, or if it is determined that the driver has not taken over the vehicle, sending an operation instruction for indicating safe pullover.

According to a fourth aspect, an intelligent driving system is provided, where the intelligent driving system includes an obtaining module, a determining module, a display module, and a control module. For an implementation of the intelligent driving system, refer to the steps of the intelligent driving method provided in any one of the third aspect or the possible implementations of the third aspect. Details are not described herein again.

According to a fifth aspect, an intelligent driving system is provided, including a processor and a memory. The memory is configured to store a computer execution instruction. When the intelligent driving system is run, the processor executes the computer execution instruction stored in the memory, such that the intelligent driving system performs the intelligent driving method in the first aspect, the third aspect, or any one of the possible designs of the first aspect, or the intelligent driving method provided in any one of the possible implementations of the third aspect. In addition, the intelligent driving system may further include a proactive vehicle execution unit, a sensor unit, and a human machine interface (or a communications interface).

According to a fourth aspect, a computer readable storage medium is provided. The computer readable storage medium stores an instruction, and when the instruction is run on a computer, the computer is enabled to perform the intelligent driving method in the first aspect, the third aspect, or any one of the possible designs of the first aspect, or the intelligent driving method provided in any one of the possible implementations of the third aspect.

According to a fifth aspect, a computer program product including an instruction is provided. When the instruction is run on a computer, the computer is enabled to perform the intelligent driving method in the first aspect, the third aspect, or any one of the possible designs of the first aspect, or the intelligent driving method provided in any one of the possible implementations of the third aspect.

According to a sixth aspect, a chip system is provided. The chip system includes a processor and a communications interface, and is configured to support an intelligent driving system in implementing the functions in the foregoing aspects. For example, the processor: obtains feature parameters of a vehicle at a current moment and a road attribute of a driving scenario of the vehicle in a preset future time period; compares the feature parameters at the current moment with feature parameters of a standard scenario in a scenario feature library; compares the road attribute of the driving scenario of the vehicle in the preset future time period with a road attribute of the standard scenario in the scenario feature library; determines a total similarity of each scenario class in the scenario feature library to a driving scenario of the vehicle at the current moment based on comparing results; determines, as the driving scenario at the current moment, a first scenario class with a highest total similarity in N scenario classes; and controls a driving status of the vehicle based on the determining result. In a possible design, the chip system further includes a memory, a proactive vehicle execution unit, a sensor unit, and a human machine interface. The memory is configured to save a program instruction, data, and an intelligent driving algorithm that are necessary for the intelligent driving system. The chip system may include a chip, or may include a chip and another discrete component.

According to a seventh aspect, the present disclosure provides an intelligent driving method, and the method includes: obtaining feature parameters of a vehicle at a current moment and a road attribute of a driving scenario of the vehicle in a preset future time period, where the feature parameters include structured semantic information, a road attribute, and a traffic status spectrum; comparing the feature parameters of the vehicle at the current moment with feature parameters of standard scenarios in a scenario feature library; comparing the road attribute of the driving scenario of the vehicle in the preset future time period with road attributes of the standard scenarios in the scenario feature library; determining, based on comparing results, a first similarity of a first standard scenario of each scenario class in the scenario feature library to a driving scenario of the vehicle at the current moment and a second similarity of a second standard scenario of the scenario class in the scenario feature library to the driving scenario of the vehicle at the current moment, where the scenario feature library includes N scenario classes, each scenario class includes M standard scenarios, each standard scenario corresponds to feature parameters, and both N and M are integers greater than or equal to 2; and determining, based on the first similarity and the second similarity of each of the N scenario classes, a scenario class corresponding to the driving scenario at the current moment.

According to an eighth aspect, the present disclosure provides an intelligent system, where the system includes: a perception fusion unit configured to obtain feature parameters of a vehicle at a current moment and a road attribute of a driving scenario of the vehicle in a preset future time period, where the feature parameters include structured semantic information, a road attribute, and a traffic status spectrum. The system further includes a scenario class recognition unit configured to: compare the feature parameters of the vehicle at the current moment with feature parameters of standard scenarios in a scenario feature library; compare the road attribute of the driving scenario of the vehicle in the preset future time period with road attributes of the standard scenarios in the scenario feature library; determine, based on comparing results, a first similarity of a first standard scenario of each scenario class in the scenario feature library to a driving scenario of the vehicle at the current moment and a second similarity of a second standard scenario of the scenario class in the scenario feature library to the driving scenario of the vehicle at the current moment, where the scenario feature library includes N scenario classes, each scenario class includes M standard scenarios, each standard scenario corresponds to feature parameters, and both N and M are integers greater than or equal to 2; and determine, based on the first similarity and the second similarity of each of the N scenario classes, a scenario class corresponding to the driving scenario at the current moment.

For technical effects brought by any design of the third aspect to the eighth aspect, refer to technical effects brought by the intelligent driving method in the first aspect, the third aspect, or any one of the possible implementations of the first aspect, or the intelligent driving method provided in any one of the possible implementations of the third aspect. Details are not described herein again.

BRIEF DESCRIPTION OF DRAWINGS

FIG. 7B is a schematic diagram of another human machine interface according to an embodiment of this application;

DESCRIPTION OF EMBODIMENTS

The method provided in embodiments of this application is described below with reference to the accompanying drawings.

Figure 1:
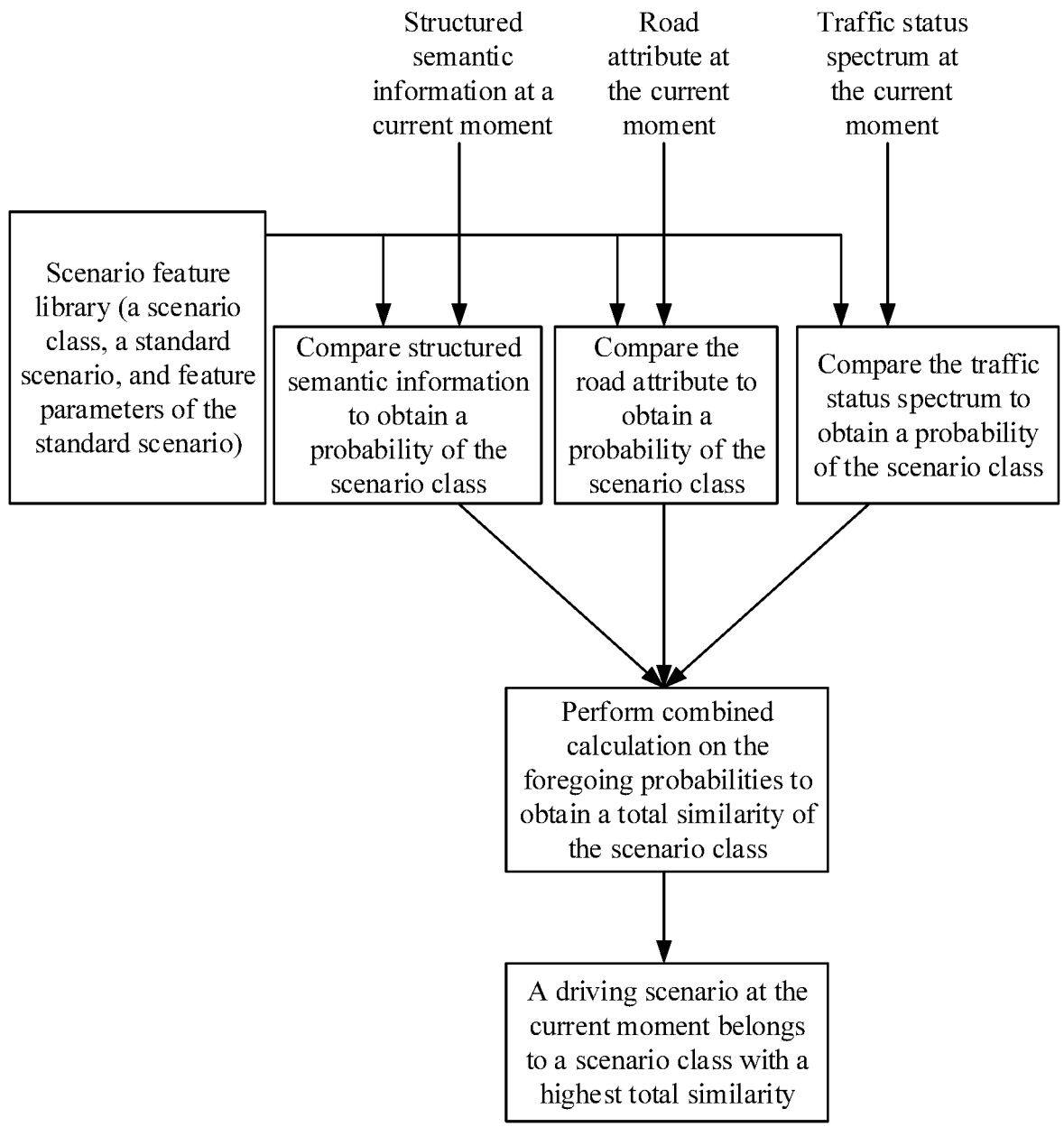
FIG. 1 is a principle block diagram according to an embodiment of this application.

FIG. 1 is a principle block diagram of an intelligent driving method according to an embodiment of this application. As shown in FIG. 1, an embodiment of this application comprises: pre-setting a scenario feature library, where the scenario feature library includes a scenario class, a standard scenario corresponding to the scenario class, and structured semantic information, a road attribute, and a traffic status spectrum that are corresponding to the standard scenario; comparing structured semantic information, a road attribute, and a traffic status spectrum that are obtained at a current moment with the structured semantic information, the road attribute, and the traffic status spectrum included in the scenario feature library respectively, to find a scenario class most similar to a driving scenario at the current moment (in this embodiment of this application, the driving scenario at the current moment may be described as a current driving scenario for ease of description); determining that the current driving scenario belongs to the scenario class, in other words, recognizing the current driving scenario by comprehensively considering a plurality of factors such as the structured semantic information, map information, and the traffic status information, and determining the scenario class to which the current driving scenario belongs; and automatically switching an intelligent driving algorithm based on a recognition result, such that a driving status of a vehicle after switching adapts to the current driving scenario, thereby implementing intelligent driving of the vehicle. For example, based on the recognition result of the current driving scenario, a driving status of the vehicle may be switched to adapt to a new driving scenario, or a current driving status may remain unchanged.

Figure 2:
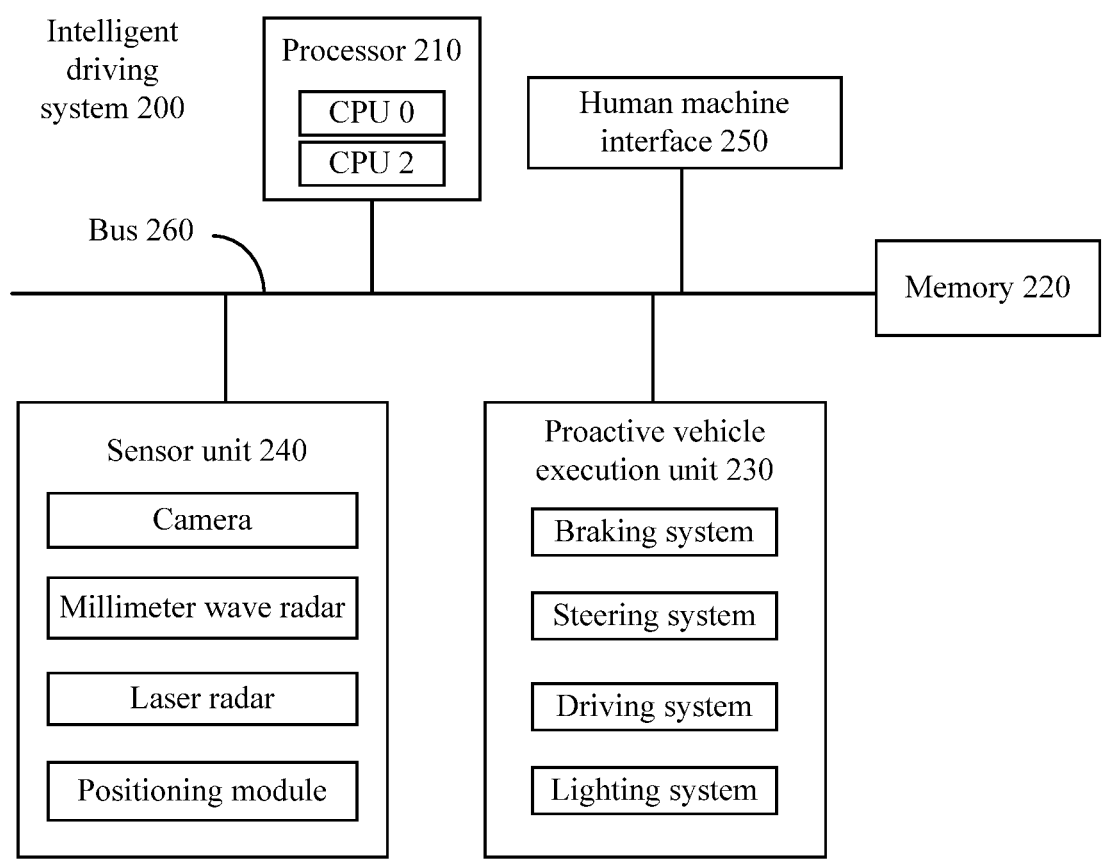
FIG. 2 is a schematic compositional diagram of an intelligent driving system according to an embodiment of this application.

The method may be performed by an intelligent driving system 200 in FIG. 2. The intelligent driving system 200 may be on a vehicle. The vehicle may be a sedan, a van, a truck, or any other type of vehicle. This is not limited. As shown in FIG. 2, the intelligent driving system 200 may include a processor 210, a memory 220, a proactive vehicle execution unit 230, a sensor unit 240, a human machine interface 250, a bus 260 connecting different system components (including the memory 220, the processor 210, the proactive vehicle execution unit 230, the sensor unit 240, and the human machine interface 250), and the like.

The processor 210 may be a central processing unit (CPU), an application-specific integrated circuit (ASIC), or one or more integrated circuits configured to implement the embodiments of this application, for example, one or more digital signal processors (DSPs) or one or more field-programmable gate arrays (FPGAs).

The memory 220 stores a program and an intelligent driving algorithm. Code of the program may be executed by the processor 210, to enable the processor 210 to perform the intelligent driving method described in the embodiments of this application. For example, the processor 210 may perform steps shown in FIG. 3. After recognizing the current driving scenario, the processor 210 may perform intelligent driving on the vehicle based on an intelligent driving algorithm corresponding to the current driving scenario.

The memory 220 may include a readable medium in a form of a volatile memory, such as a random-access memory (RAM) and/or a cache memory, and may further include a read-only memory (ROM). The memory 220 may further include a program/utility tool with a set of (at least one) program modules. Such a program module includes but is not limited to an operating system, one or more application programs, and another program module and program data. Each or a combination of these examples may include implementation of a network environment.

The vehicle execution unit 230 includes a braking system, a steering system, a driving system, a lighting system, and the like. Each system is capable of receiving an instruction from an upper layer and performing an instructed action. The processor 210 may send an operation instruction to the vehicle execution unit 230 according to provisions of the intelligent driving algorithm, to enable the driving status of the vehicle to conform to the current driving scenario.

The sensor unit 240 includes systems such as a camera, a millimeter wave radar, a laser radar, a map, and a positioning module, and is mainly configured to collect related information about a thing around the vehicle. The positioning module may be a Global Positioning System (GPS), the GLONASS system, or the BeiDou system.

The human-machine interaction module 250 may be a display or a touchscreen disposed on the vehicle, and may be referred to as a human machine interface (HMI). A driver may send an operation instruction to the vehicle through a touch operation. The human-machine interaction module 250 may display an instruction or information generated by the processor 210 to the driver. Similarly, the human-machine interaction module 250 may also implement interaction between the vehicle and the driver using a voice or in another manner. A form and an operation manner of the human-machine interaction module 250 are not limited in this application.

The bus 260 may represent one or more of several types of bus structures, including a memory bus or a memory controller, a peripheral bus, a graphics acceleration port, a processor, or a local bus in any bus structure of a plurality of bus structures.

The following describes intelligent driving technologies provided in the embodiments of this application with reference to FIG. 2. It should be noted that a name of each parameter in the following embodiments of this application is merely an example, and another name may be used in implementation. This is not specifically limited in the embodiments of this application.

Figure 3:
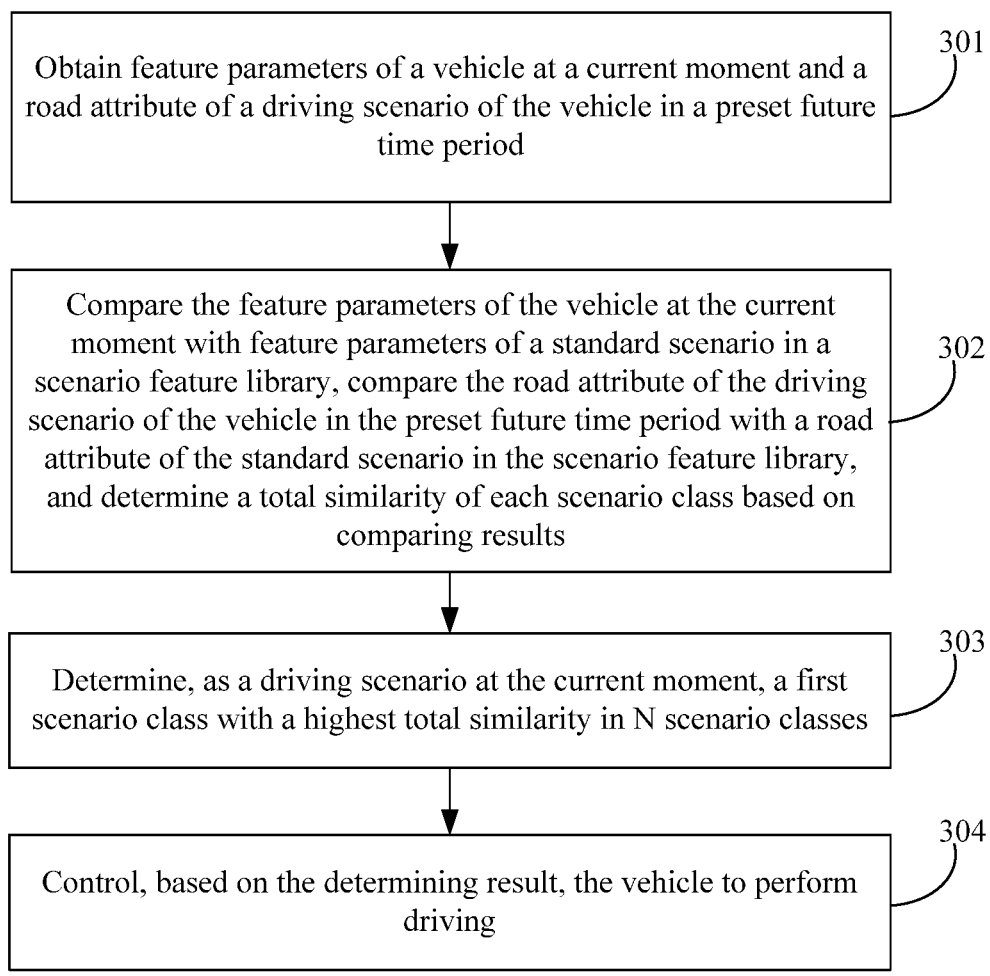
FIG. 3 is a flowchart of an intelligent driving method according to an embodiment of this application.

FIG. 3 shows an intelligent driving method according to an embodiment of this application. As shown in FIG. 3, the method may include the following steps.

Step 301. Obtain feature parameters of a vehicle at a current moment and a road attribute of a driving scenario of the vehicle in a preset future time period.

The feature parameters may include structured semantic information, a road attribute, and a traffic status spectrum, and may further include another feature parameter used to represent a driving scenario. This is not limited.

In this embodiment of this application, the structured semantic information may be converted from information about an object in a driving scenario, and may be used to represent an attribute of the object in the driving scenario. For example, the structured semantic information may include parameter information such as coordinates, a speed, and an acceleration of the object. The object in the driving scenario may be a person, a tree, a flower and grass, a building, a mountain, a river, or the like. For example, information about an object around the driving vehicle at the current moment may be collected in real time using an external perception module (for example, a vision sensor (or a camera), a laser radar, a millimeter wave radar, a GPS positioning module, and a high-precision map) of the vehicle, and the collected object information is processed using a perception fusion algorithm, to obtain the structured semantic information. The perception fusion algorithm is an algorithm commonly used in image processing. Different perception fusion algorithms correspond to different driving scenarios. In this embodiment of this application, for a process of obtaining the structured semantic information through processing using the perception fusion algorithm, refer to other approaches. Details are not described herein.

The road attribute may be used to represent a type of a road along which the vehicle is travelling, for example, a highway, an intercity road, a country road, an underground garage lane, or a main road. For example, the road attribute at the current moment may be determined using the GPS positioning module and the high-precision map of the vehicle. For example, a current driving location of the vehicle is positioned using the GPS positioning module, a location positioned for the vehicle is searched for in the high-precision map, and the road attribute is determined based on an ambiance at the location. For example, the road attribute of the driving scenario of the vehicle in the preset future time may be determined using the GPS positioning module and the high-precision map of the vehicle, and global planning information. The global planning information is used to specify a driving route of a user for this time, and may be preset by the user and stored on the vehicle. The preset future time period may be a time period after the current moment, and the time period may be set as required. This is not limited. For example, when the driving route of the user for this time is from a place A to a place E passing through places B, C, and D, if the vehicle is currently positioned at the place B, the preset future time period is set to two hours after which the vehicle may drive to the place C, and it is determined, by referring to the high-precision map, that from the place B to the place C, there is a section of a highway that needs to be crossed, it may be determined that the road attribute of the driving scenario of the vehicle in the preset future time period is: a highway.

The traffic status spectrum may be used to represent a running status of the vehicle and a running status of a traffic participant vehicle. The running status of the vehicle may include but is not limited to a speed of the vehicle, a rotation angle of a steering wheel, a yaw angle of the vehicle, and the like. The traffic participant vehicle may be a vehicle driving around the vehicle. The running status of the traffic participant vehicle may include but is not limited to a distance of the traffic participant vehicle from the vehicle, a running speed of the traffic participant vehicle, and the like. For example, vehicle status parameter information reported by a vehicle execution module (for example, a braking system, a steering system, a driving system, and a lighting system) in a period of time may be collected, and Fourier transform is performed on the vehicle status information to generate a spectrum feature of the vehicle status parameter information. In addition, participant vehicle running status information in a period of time is collected using the sensor unit (for example, a vision sensor (or a camera), a laser radar, a millimeter wave radar, a GPS positioning module, and a high-precision map) of the vehicle, and Fourier transform is performed on the participant vehicle status information to generate a second spectrum feature of the participant vehicle running status information. The spectrum feature and the second spectrum feature form the traffic status spectrum at the current moment. The period of time may be a period of time including the current moment. The Fourier transform may be an existing commonly used Fourier transform algorithm. Details are not described.

Step 302. Compare the feature parameters of the vehicle at the current moment with feature parameters of a standard scenario in a scenario feature library, compare the road attribute of the driving scenario of the vehicle in the preset future time period with a road attribute of the standard scenario in the scenario feature library, and determine a total similarity of each scenario class to a driving scenario of the vehicle at the current moment based on comparing results.

The scenario feature library may include N scenario classes, each scenario class may be represented by M standard scenarios, and each standard scenario corresponds to the following feature parameters: structured semantic information, a road attribute, and a traffic status spectrum. N is an integer greater than or equal to 1, and M is an integer greater than or equal to 1. The scenario classes include some of current common driving scenarios. Optionally, a large quantity of driving scenarios of the vehicle at different time moments may be collected, and the collected driving scenarios are analyzed and processed using a statistical analysis algorithm, to obtain the N scenario classes, the standard scenario corresponding to each scenario class, and the feature parameters corresponding to each standard scenario. The statistical analysis algorithm is an existing algorithm. Details are not described. In addition, a similarity between different road attributes may be analyzed using the statistical analysis algorithm, and the similarity between the different road attributes is stored in the scenario feature library. A higher similarity between the different road attributes indicates more similar road circumstances, and a lower similarity between the different road attributes indicates less similar road circumstances. For example, a difference between a highway and an expressway is small, and a similarity between them is relatively high; and a difference between the expressway and a country road is large, and a similarity between them is relatively low.

The scenario feature library may be pre-stored in an intelligent driving system in a form of a list and dynamically maintained. For example, when a new scenario class emerges, a standard scenario corresponding to the scenario class and feature parameters corresponding to the standard scenario may be added into the scenario feature library in real time. Alternatively, the scenario feature library is stored on another device, and the scenario feature library is obtained from the other device when step 302 is performed.

It should be noted that structured semantic information, road attributes, and traffic status spectra corresponding to standard scenarios not only may be stored in a same scenario feature library, but also may be stored in different feature libraries. For example, structured semantic information of the M standard scenarios corresponding to each of the N scenario classes may be stored in a scenario semantics library in a form of a list, road attributes of the M standard scenarios corresponding to each of the N scenario classes may be stored in a scenario road attribute library in a form of a list, and traffic status spectra of the M standard scenarios corresponding to each of the N scenario classes may be stored in a scenario traffic status feature library in a form of a list.

The total similarity of the scenario class may be used to represent a resemblance degree of the scenario class to the current driving scenario. A higher total similarity indicates that the current driving scenario is more likely the scenario class, and a lower total similarity indicates the current driving scenario cannot be the scenario class.

Step 303. Determine, as the driving scenario at the current moment, a first scenario class with a highest total similarity in the N scenario classes.

Optionally, total similarities of the N scenario classes may be ranked in descending order, and a scenario class ranked first is determined as the driving scenario at the current moment; or total similarities of the N scenario classes are ranked in ascending order, and a scenario class ranked last is determined as the driving scenario at the current moment.

Step 304. Control, based on the determining result, the vehicle to perform intelligent driving.

The controlling the vehicle to perform intelligent driving may be comprise controlling the vehicle execution unit of the vehicle, for example, the braking system, the steering system, the driving system, and the lighting system of the vehicle, to enable a current driving status of the vehicle to satisfy the current driving scenario.

In another possible implementation of this application, the total similarity of each scenario class may not be determined or compared, but the scenario class corresponding to the driving scenario at the current moment may be determined based on several standard scenarios in each scenario class, moment feature parameters of the vehicle, and a similarity of the driving scenario of the vehicle in the preset future time period.

After the feature parameters of the vehicle at the current moment and the road attribute of the driving scenario of the vehicle in the preset future time period are obtained, the feature parameters of the vehicle at the current moment may be compared with feature parameters of standard scenarios in a scenario feature library, and the road attribute of the driving scenario of the vehicle in the preset future time period may be compared with road attributes of the standard scenarios in the scenario feature library. Additionally, a first similarity of a first standard scenario of each scenario class in the scenario feature library to a driving scenario of the vehicle at the current moment and a second similarity of a second standard scenario of the scenario class in the scenario feature library to the driving scenario of the vehicle at the current moment may be determined based on comparing results Further, a scenario class corresponding to the driving scenario at the current moment may be determined based on the first similarity and the second similarity of each of the N scenario classes.

Alternatively, in another possible implementation of this application, after the feature parameters of the vehicle at the current moment and the road attribute of the driving scenario of the vehicle in the preset future time period are obtained, the feature parameters of the vehicle at the current moment may be compared with feature parameters of standard scenarios in a scenario feature library, and the road attribute of the driving scenario of the vehicle in the preset future time period may be compared with road attributes of the standard scenarios in the scenario feature library. Additionally, a similarity of each standard scenario of each scenario class in the scenario library to a driving scenario of the vehicle at the current moment may be separately determined based on comparing results, and a similarity of a standard scenario with a highest similarity in each scenario class may be used as a similarity of the scenario class. Further, a scenario class corresponding to the driving scenario at the current moment may be determined based on the similarity of each scenario class.

According to the intelligent driving method shown in FIG. 3, the scenario class to which the current driving scenario of the vehicle belongs may be recognized based on three dimensions: the structured semantic information, the road attribute, and the traffic status spectrum. As such, information referred in scenario class recognition is more comprehensive and more reliable. This improves accuracy of scenario recognition and implementability of intelligent driving. In addition, the scenario class is recognized based on the structured semantic information instead of a picture, thereby reducing operational complexity.

For example, comparing the feature parameters at the current moment with feature parameters of a standard scenario in a scenario feature library, comparing the road attribute of the driving scenario of the vehicle in the preset future time period with a road attribute of the standard scenario in the scenario feature library, and determining a total similarity of each scenario class based on comparing results in step 302 may include the following operations (1) to (4).

(1) Compare the structured semantic information at the current moment with structured semantic information of the standard scenario in the scenario feature library, to obtain a first similarity of the standard scenario, and perform combined calculation on first similarities of all standard scenarios belonging to the scenario class, to obtain a first probability of the scenario class.

Figure 4A:
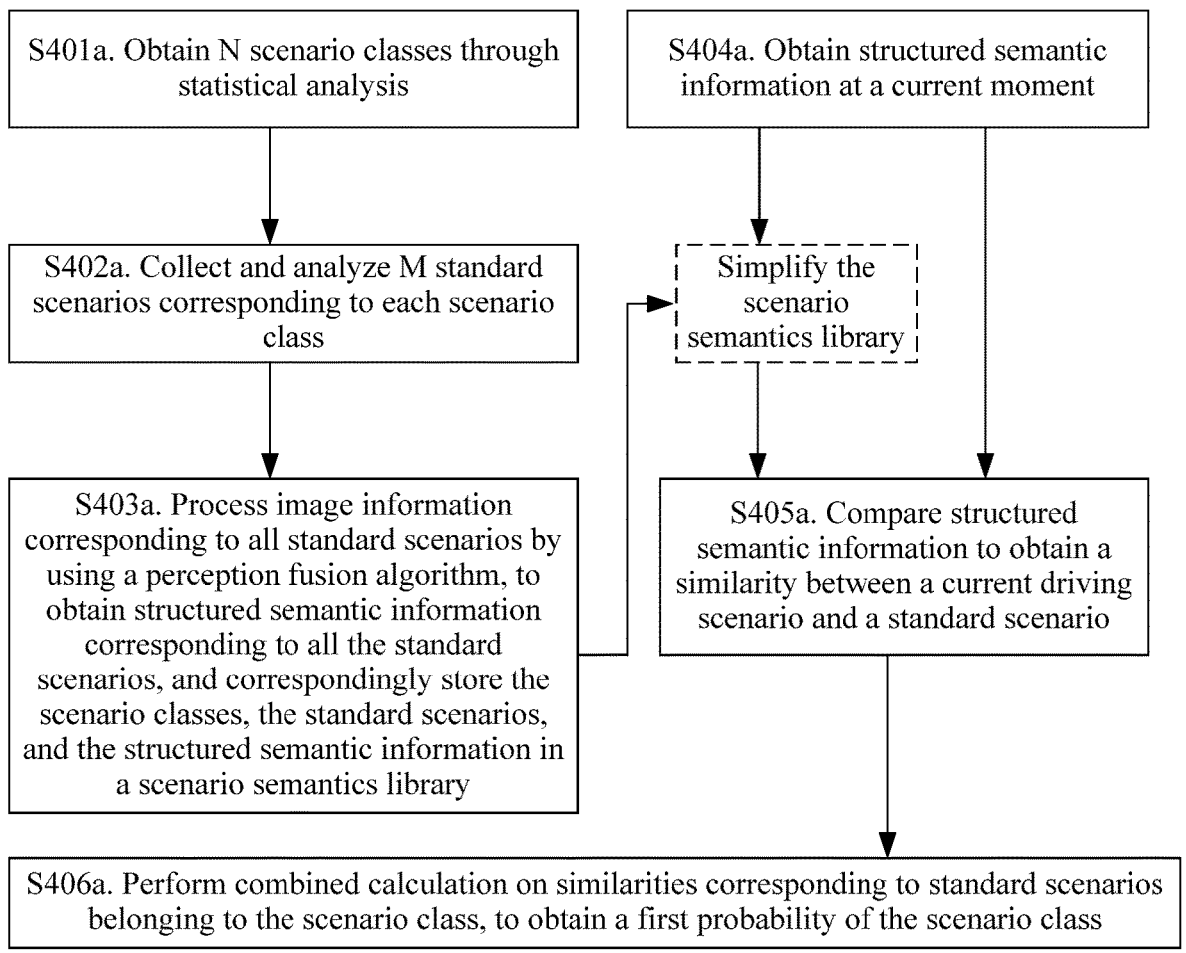
FIG. 4A is a flowchart of a method for calculating a first probability according to an embodiment of this application.

For this determining process, refer to FIG. 4A. The following steps may be included.

S401a. Obtain the N scenario classes through statistical analysis.

S402a. Collect and analyze the M standard scenarios corresponding to each scenario class.

S403a. Process image information corresponding to all standard scenarios using a perception fusion algorithm, to obtain structured semantic information corresponding to all the standard scenarios, and correspondingly store the scenario class, the standard scenarios, and the structured semantic information in a scenario semantics library.

S404a. Obtain the structured semantic information at the current moment.

S405a. Compare the structured semantic information at the current moment with the structured semantic information corresponding to the standard scenario in the scenario semantics library, to obtain the similarity between the current driving scenario and the standard scenario.

S406a. For any scenario class, perform combined calculation on similarities corresponding to standard scenarios belonging to the scenario class, to obtain a first probability of the scenario class. Combined calculation may refer to weighted summation, summation averaging, or the like.

Optionally, to reduce calculation complexity, in FIG. 4A, the structured semantic information of the standard scenarios corresponding to all the scenario classes may be filtered, and a similarity of a standard scenario without real-time structured semantic information is set to 0 (or assigned a value equal to 0). For example, a first similarity, a second similarity, a third similarity, and a fourth similarity of standard scenarios without real-time structured semantic information may be set to 0s. In other words, structured semantic information of these standard scenarios need not be compared with that corresponding to a real-time driving scenario. "Without real-time structured semantic information" may mean that an object represented by structured semantic information of this type is completely different from an object represented by the structured semantic information corresponding to the real-time driving scenario. For example, structured semantic information corresponding to a standard scenario 1 may be used to represent an attribute of an object such as a mountain or a tree, but the structured semantic information corresponding to the real-time driving scenario is used to represent an attribute of an object such as a farmhouse or grassland. The objects are totally irrelevant, and therefore it may be determined that the structured semantic information corresponding to the standard scenario 1 does not include real-time structured semantic information.

(2) Compare the road attribute at the current moment with the road attribute of the standard scenario in the scenario feature library, to obtain a second similarity between the standard scenario and the current driving scenario; perform combined calculation on second similarities of all the standard scenarios belonging to the scenario class, to obtain a second probability of the scenario class; compare the road attribute of the driving scenario of the vehicle in the preset future time period with the road attribute of the standard scenario in the scenario feature library, to obtain a third similarity between the standard scenario and the current driving scenario; and perform combined calculation on third similarities of all the standard scenarios belonging to the scenario class, to obtain a third probability of the scenario class.

Figure 4B:
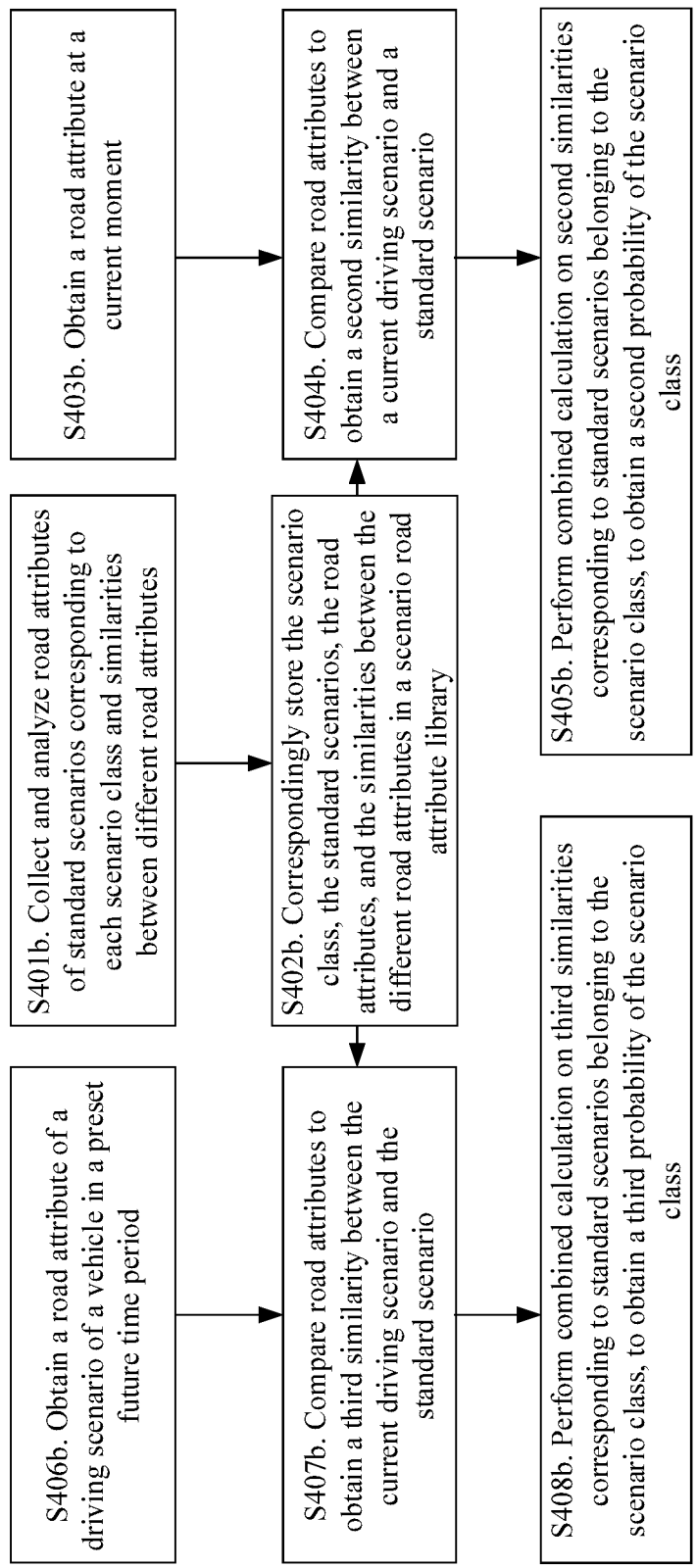
FIG. 4B is a flowchart of a method for calculating a second probability and a third probability according to an embodiment of this application.

For this determining process, refer to FIG. 4B. The following steps may be included.

S401b. Collect and analyze road attributes of standard scenarios corresponding to each scenario class and similarities between different road attributes.

S402b. Correspondingly store the scenario class, the standard scenarios, the road attributes, and the similarities between the different road attributes in a scenario road attribute library.

S403b. Obtain the road attribute at the current moment.

S404B. Compare the road attribute at the current moment with the road attribute corresponding to the standard scenario in the scenario road attribute library, to obtain the second similarity between the current driving scenario and the standard scenario.

S405b. For any scenario class, perform combined calculation on second similarities corresponding to standard scenarios belonging to the scenario class, to obtain a second probability of the scenario class.

S406b. Obtain the road attribute of the driving scenario of the vehicle in the preset future time period.

S407b. Compare the road attribute of the driving scenario of the vehicle in the preset future time period with the road attribute corresponding to the standard scenario in the scenario road attribute library, to obtain the third similarity between the current driving scenario and the standard scenario.

S408b. Perform combined calculation on the third similarities corresponding to the standard scenarios belonging to the scenario class, to obtain a third probability of the scenario class.

The comparing the road attribute at the current moment with the road attribute corresponding to the standard scenario in the scenario road attribute library, to obtain the similarity between the current driving scenario and the standard scenario may include: if the road attribute at the current moment is the same as the road attribute corresponding to the standard scenario in the scenario road attribute library, determining the similarity as 1; or if the road attribute at the current moment is different from the road attribute corresponding to the standard scenario in the scenario road attribute library, determining, based on the pre-stored similarities between the different road attributes in the scenario road attribute library, the similarity between the road attribute at the current moment and the road attribute corresponding to the standard scenario in the scenario road attribute library. Combined calculation may refer to weighted summation, summation averaging, or the like.

(3) Compare the traffic status spectrum at the current moment with a traffic status spectrum of the standard scenario in the scenario feature library, to obtain a fourth similarity between the standard scenario and the current driving scenario; and perform combined calculation on fourth similarities of all the standard scenarios belonging to the scenario class, to obtain a fourth probability of the scenario class.

Figure 4C:
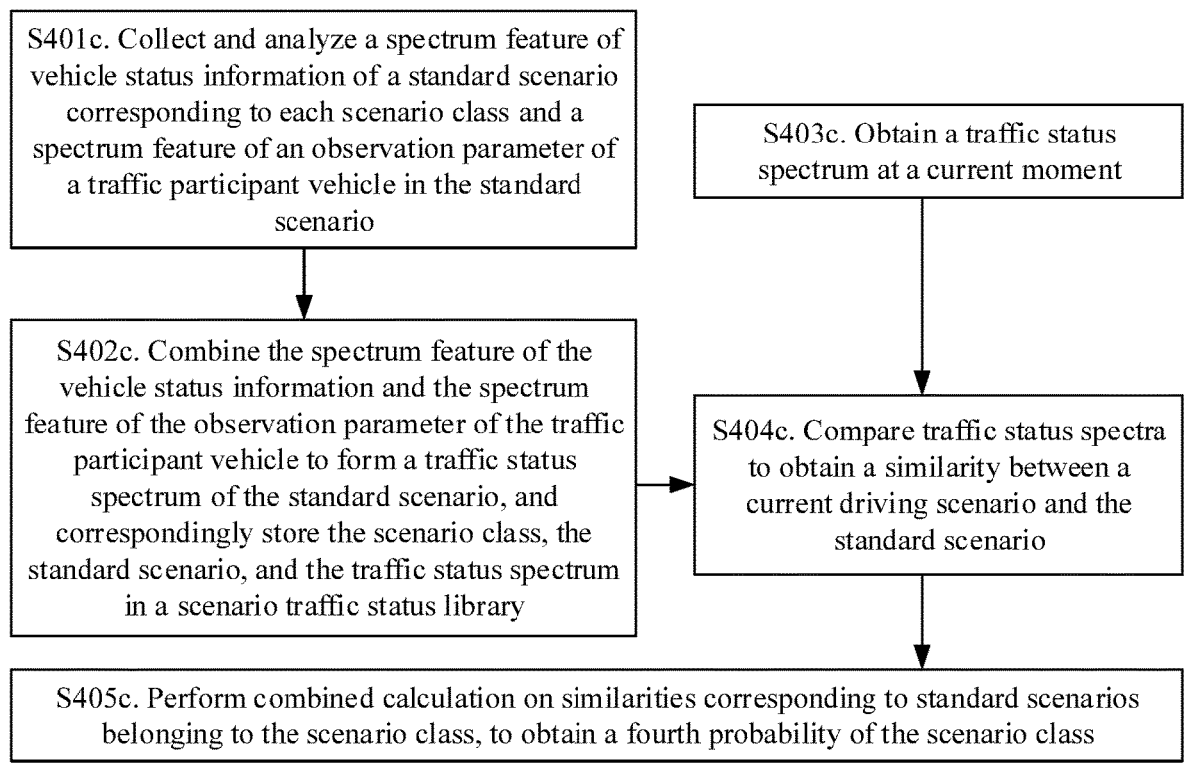
FIG. 4C is a flowchart of a method for calculating a fourth probability according to an embodiment of this application.

For this determining process, refer to FIG. 4C. The following steps may be included:

S401c. Collect and analyze a spectrum feature of vehicle status information of a standard scenario corresponding to each scenario class and a spectrum feature of an observation parameter of a traffic participant vehicle in the standard scenario.

S402c. Combine the spectrum feature of the vehicle status information and the spectrum feature of the observation parameter of the traffic participant vehicle to form a traffic status spectrum of the standard scenario, and correspondingly store the scenario class, the standard scenario, and the traffic status spectrum in a scenario traffic status library.

S403c. Obtain the traffic status spectrum at the current moment.

S404C. Compare the traffic status spectrum at the current moment with the traffic status spectrum corresponding to the standard scenario in the scenario traffic status spectrum library, to obtain the similarity between the current driving scenario and the standard scenario.

S405c. For any scenario class, perform combined calculation on similarities corresponding to standard scenarios belonging to the scenario class, to obtain a fourth probability of the scenario class.

Combined calculation may refer to weighted summation, summation averaging, or the like.

(4) Obtain the total similarity of the scenario class based on the first probability, the second probability, the third probability, and the fourth probability of the scenario class.

For example, a summation operation may be performed on the first probability, the second probability, the third probability, and the fourth probability of the scenario class to obtain the total similarity of the scenario class, and the summation operation may be weighted summation, summation averaging, or the like. For example, assuming that the first probability of the scenario class is, the second probability of the scenario class is, the third probability of the scenario class is, and the fourth probability of the scenario class is, the total similarity of the scenario class may be: where are weighted coefficients and may be set as required. This is not limited.

It should be noted that in this embodiment of this application, similarities (the first similarity, the second similarity, the third similarity, and the fourth similarity) of a standard scenario may be used to represent a possibility that the current driving scenario belongs to the standard scenario. A higher similarity indicates that the current driving scenario more likely belongs to the standard scenario, and a lower similarity indicates that the current driving scenario cannot belong to the standard scenario.

Figure 5:
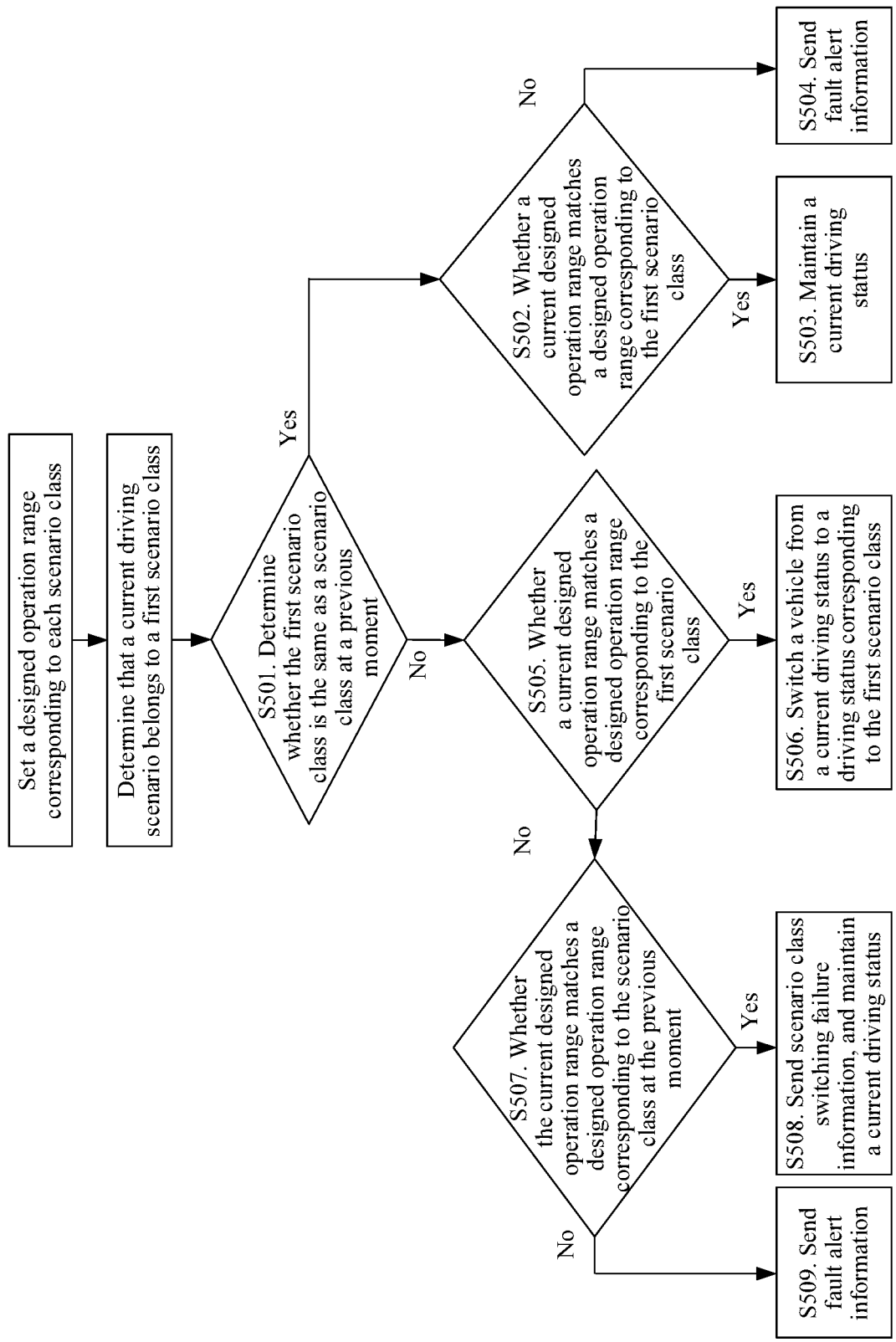
FIG. 5 is a flowchart of an intelligent switching method according to an embodiment of this application.

For example, the controlling, based on the determining result, the vehicle to perform driving in step 304 is shown in FIG. 5, and may include the following steps.

S501. Determine whether the first scenario class is the same as a scenario class at a previous moment.

S502. If the first scenario class is the same as the scenario class at the previous moment, determine whether a current designed operation range of the vehicle matches a designed operation range corresponding to the first scenario class; and if the current designed operation range of the vehicle matches the designed operation range corresponding to the first scenario class, perform step S503, or if the current designed operation range of the vehicle does not match the designed operation range corresponding to the first scenario class, perform step S504.

S503. Maintain the current driving status.

S504. Send fault alert information (or manual takeover request information).

S505. If the first scenario class is different from the scenario class at the previous moment, determine whether the current designed operation range of the vehicle matches the designed operation range corresponding to the first scenario class; and if the current designed operation range of the vehicle matches the designed operation range corresponding to the first scenario class, perform step S506, or if the current designed operation range of the vehicle does not match the designed operation range corresponding to the first scenario class, perform S507.

S506. Switch the vehicle from the current driving status to a driving status corresponding to the first scenario class.

S507. Determine whether the current designed operation range of the vehicle matches a designed operation range corresponding to the scenario class at the previous moment, and if the current designed operation range of the vehicle matches the designed operation range corresponding to the scenario class at the previous moment, perform step S508, or if the current designed operation range of the vehicle does not match the designed operation range corresponding to the scenario class at the previous moment, perform step S509.

S508. Send scenario class switching failure information, and maintain the current driving status.

S509. Send fault alert information (or manual takeover request information).

The previous moment may be a moment before the current moment.

The designed operation range of the vehicle may refer to a driving status of the vehicle when the vehicle normally operates in a driving scenario, and may include a driver status, a vehicle fault status, a controller hardware fault status, structured semantic information, and the like. Optionally, designed operation ranges corresponding to the N scenario classes may be collected and analyzed, and the designed operation ranges corresponding to the N scenario classes are pre-stored in the scenario feature library. For a process of collecting and analyzing the designed operation ranges corresponding to the N scenario classes, refer to other approaches. Details are not described.

The fault alert information may be used to indicate that the vehicle may currently be in a faulty state and is not suitable for driving. The manual takeover request information may be used to request the user to manually control the vehicle to perform intelligent driving.

The switching the vehicle from the current driving status to a driving status corresponding to the first scenario class may include: obtaining an intelligent driving algorithm corresponding to the first scenario class, and switching a running status of the vehicle based on the intelligent driving algorithm corresponding to the first scenario class. An intelligent driving algorithm corresponds to a scenario class, and the N scenario classes may correspond to N intelligent driving algorithms one by one. Optionally, the N intelligent driving algorithms corresponding to the N scenario classes may be pre-stored in the intelligent driving system.

The scenario class switching failure information may be used to indicate a failure to switch the current driving status of the vehicle to the driving status corresponding to the first scenario class. The sending scenario class switching failure information, and maintaining the current driving status may include: sending the scenario class switching failure information to the user through a human-machine interaction module, and continuing to execute an intelligent driving algorithm corresponding to a current scenario class.

Figure 6A:
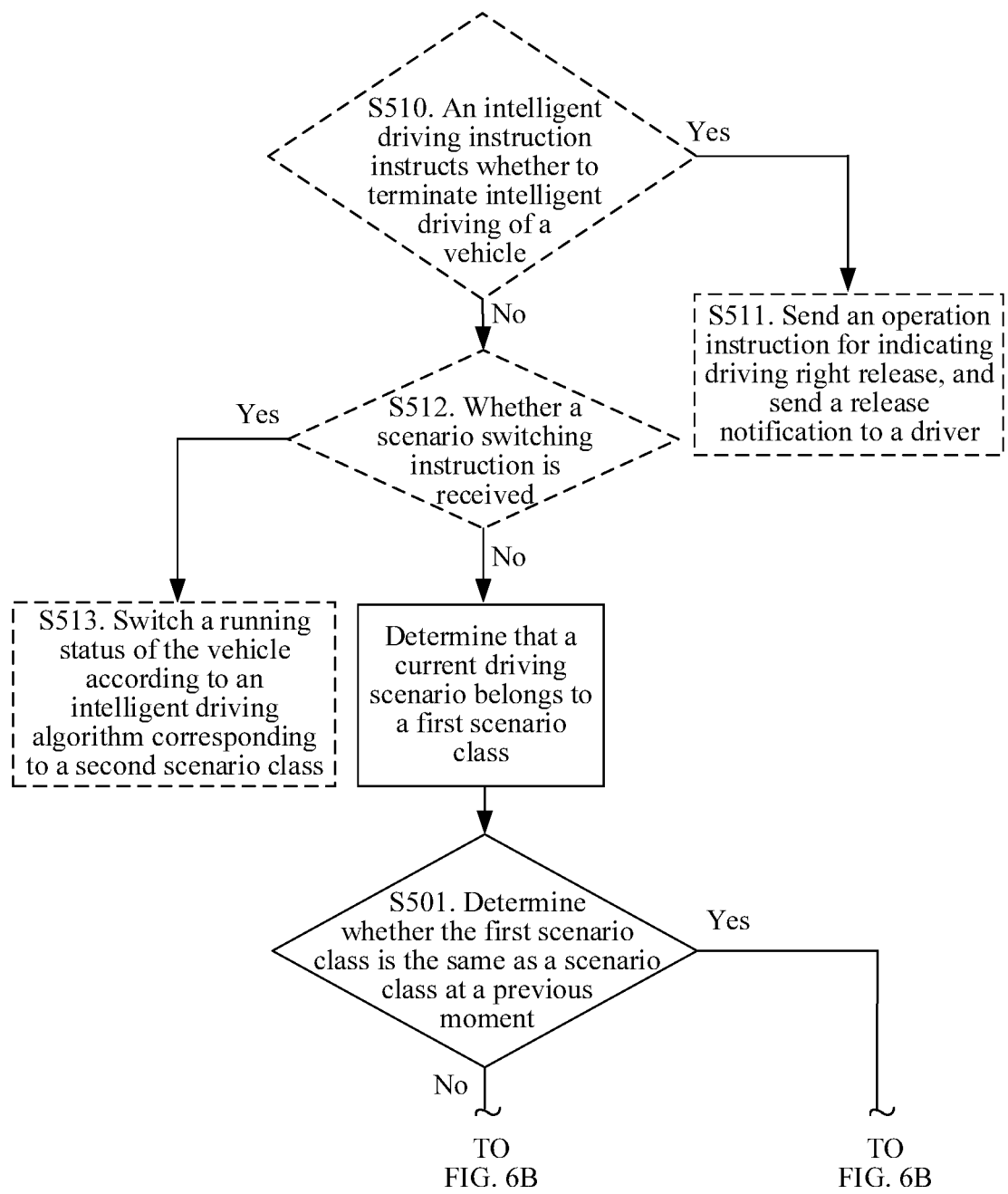
FIG. 6A and FIG. 6B are flowcharts of another intelligent switching method according to an embodiment of this application.
Figure 6B:
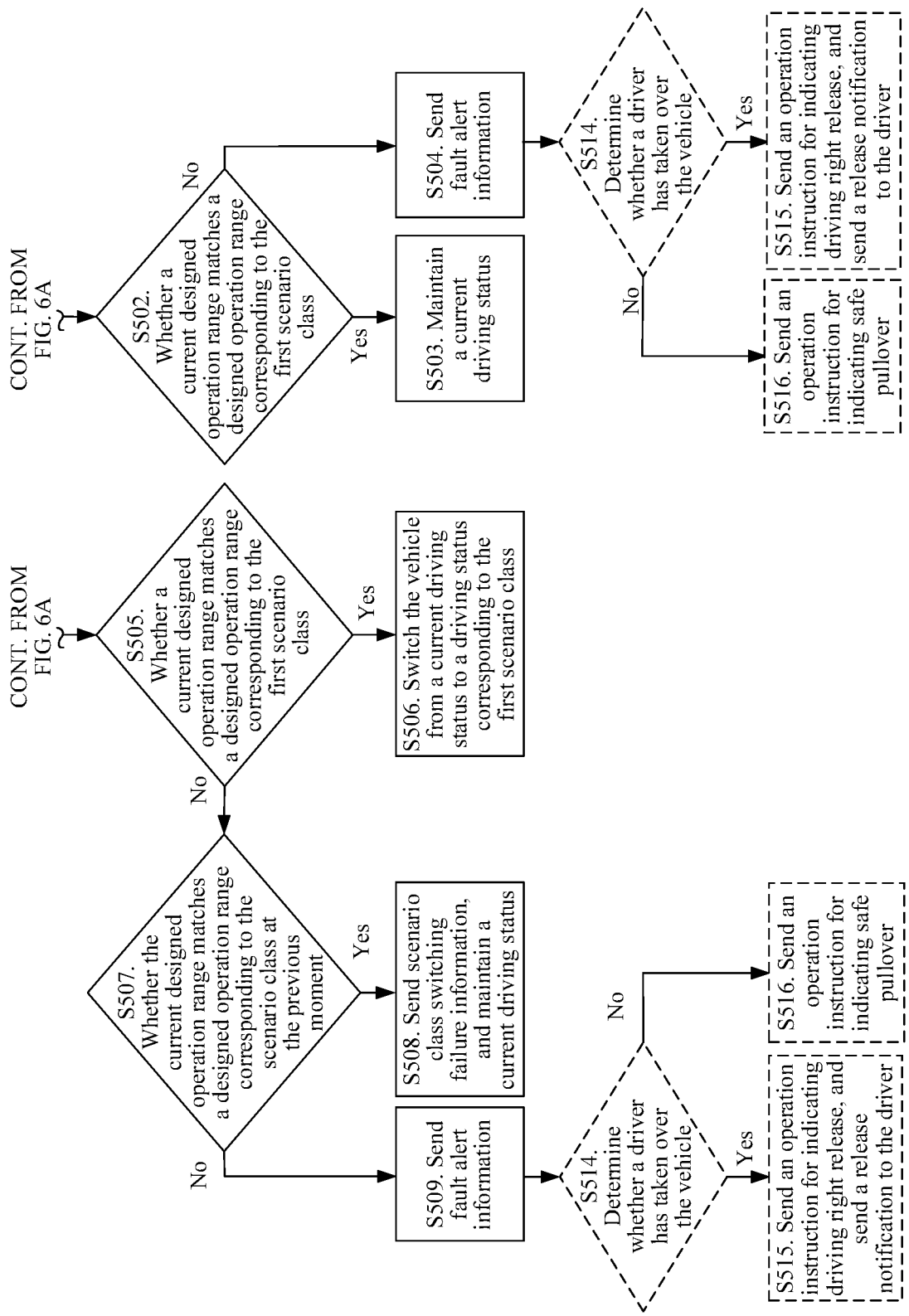

Optionally, to improve user experience in a driving process of the vehicle, before the controlling, based on the determining result, the vehicle to perform intelligent driving, as shown in FIG. 6A and FIG. 6B, the method may further include the following steps.

S510. Obtain an intelligent driving instruction, where the intelligent driving instruction is used to instruct whether to terminate intelligent driving of the vehicle (in other words, whether to perform intelligent driving on the vehicle), and the intelligent driving instruction may be sent by a driver or through a cloud operation.

S511. If the intelligent driving instruction is used to instruct to terminate intelligent driving of the vehicle, send, to the proactive vehicle execution unit, an operation instruction for indicating driving right release, and send a release notification to the driver.

The sending, to the proactive vehicle execution unit, an operation instruction for indicating driving right release may include but is not limited to releasing control rights over a steering wheel, a brake, an accelerator, and the like. The release notification may be used to notify the driver (or the user) that intelligent driving of the vehicle has been terminated, in other words, intelligent driving rights of the vehicle have been released. Optionally, the release notification may include but is not limited to one or more operations such as voice alert, light alert, and seat belt tightening.

S512. If the intelligent driving instruction is used to instruct the vehicle to perform intelligent driving (in other words, not to terminate the intelligent driving of the vehicle), determine whether a scenario switching instruction for instructing to switch to a driving status corresponding to a second scenario class is received; and if the scenario switching instruction is received, perform step S513, or if the scenario switching instruction is not received, control, based on an execution result in FIG. 5, the vehicle to perform intelligent driving.

S513. Obtain an intelligent driving algorithm corresponding to the second scenario class, and switch a running status of the vehicle based on the intelligent driving algorithm corresponding to the second scenario class.

For example, an operation instruction is sent to the proactive vehicle execution unit (the braking system, the steering system, the driving system, the lighting system, and the like) based on the intelligent driving algorithm corresponding to the second scenario class, such that the proactive vehicle execution unit operates according to the operation instruction.

As shown in FIG. 6A and FIG. 6B, after the sending fault alert information (or manual takeover request information), the method may further include the following steps.

S514. Determine whether the driver has taken over the vehicle, and if the driver has taken over the vehicle, perform step S515, or if the driver has not taken over the vehicle, perform step S516.

For example, a vehicle status parameter input by the proactive vehicle execution unit may be used to determine whether the driver has taken over the vehicle.

S515. Send, to the proactive vehicle execution unit, an operation instruction for indicating driving right release, and send a release notification to the driver.

S516. Send, to the proactive vehicle execution unit, an operation instruction for indicating safe pullover.

The operation instruction for indicating safe pullover may include but is not limited to slow return of the steering wheel, accelerator release, a specific braking percentage, and the like.

In this way, safety in using each scenario class algorithm may be ensured by determining whether a designed operation range of the scenario class is matched and supervising a switching and interaction process. In addition, smooth intelligent driving algorithm switching in different scenarios is ensured in this embodiment of this application, thereby implementing all-situation-mode intelligent driving.

The following describes the intelligent driving algorithm provided in this embodiment of this application using an example in which a sedan of a specific model performs intelligent driving from a point A to a point B. The sedan has proactive vehicle execution units such as a braking system, a steering system, a driving system, and a lighting system. These systems all are capable of receiving an instruction from an intelligent driving system. In addition, the sedan has sensor units such as a camera, a radar, a laser, a map, and a positioning module. In addition, in an intelligent driving process from the point A to the point B, there are road sections such as an urban main road with two lanes, an urban main road with four lanes, an urban junction of three roads, an urban junction of four roads, an urban overpass road section, an urban shadow intersection between buildings, an urban road building section, an urban garbage dumping road section, a country road, a highway toll station, a highway ramp, a highway road building section, and a highway traffic accident road section. There may be a traffic jam scenario and a traffic jam-free scenario for each road section.

(1) Scenarios for intelligently driving from the point A to the point B are classified, and the scenarios for driving from the point A to the point B may be classified into eight types after being collected and analyzed: a. structured urban traffic jam-free scenario class {a smooth scenario for the urban main road with two lanes, a smooth scenario for the urban main road with four lanes, a smooth scenario for the urban overpass road section . . . }; b. junction scenario class {the urban junction of three roads, the urban junction of four roads . . . }; c. non-structured irregular road scenario class {an urban road building section scenario, a country road scenario, a highway ramp scenario, a highway road building section scenario, a highway traffic accident road section scenario . . . }; d. highway traffic jam-free scenario class {a scenario for a highway with two lanes, a scenario for a highway with three lanes . . . }; e. structured urban and highway traffic jam scenario class {a traffic jam scenario for the urban main road with two lanes, a traffic jam scenario for the urban main road with four lanes, a traffic jam scenario of the urban overpass road section, a traffic jam scenario of the highway with two lanes . . . }; f. tunnel scenario class {the urban shadow junction between buildings, a tunnel . . . }; g. parking scenario class {a parking lot A scenario, a parking lot B scenario . . . }; and h. toll station scenario class {a highway entry scenario, a highway exit scenario . . . }.

(2) Standard scenarios of each scenario class are collected and analyzed: a. structured urban traffic jam-free scenario class {a standard scenario 1, a standard scenario 2, . . . , and a standard scenario 20}; b. junction scenario class {a standard scenario 1, a standard scenario 2, . . . , and a standard scenario 20}; c. non-structured irregular road scenario class {a standard scenario 1, a standard scenario 2, . . . , and a standard scenario 20}; d. highway traffic jam-free scenario class {a standard scenario 1, a standard scenario 2, . . . , and a standard scenario 20}; e. structured urban and highway traffic jam scenario class {a standard scenario 1, a standard scenario 2, . . . , and a standard scenario 20}; f. tunnel scenario class {a standard scenario 1, a standard scenario 2, . . . , and a standard scenario 20}; g. parking scenario class {a standard scenario 1, a standard scenario 2, . . . , and a standard scenario 20}; and h. toll station scenario class {a standard scenario 1, a standard scenario 2, . . . , and a standard scenario 20}.

(3) Structured semantic information, road attributes, and traffic status spectra of each scenario class are obtained to establish a scenario feature library.

(4) Structured semantic information of a real-time scenario is compared with structured semantic information of each standard scenario to obtain a similarity, in order to obtain, through calculation from a perception dimension, a probability that the current driving scenario belongs to each scenario class; road attribute information of the real-time scenario, road attribute information of a globally planned site, and road attributes of each scenario class are compared to obtain, through calculation from a map dimension, a probability that the current driving scenario belongs to each scenario class and a probability that an anticipated scenario belongs to each scenario class; and through calculation from a traffic status dimension, a probability that the current driving scenario belongs to each scenario class is obtained based on a similarity of vehicle status parameter information of the real-time scenario to a feature spectrum of a vehicle status parameter of each scenario class, and a similarity of observation parameter information of a traffic participant vehicle to a feature spectrum of an observation parameter of a traffic participant vehicle.

A total similarity between the real-time scenario and each scenario class is comprehensively calculated based on the foregoing probabilities for the three dimensions, and a scenario class with a highest total similarity is a recognized scenario class.

(5) If the recognized scenario class is the junction scenario class, and a running intelligent driving algorithm is a structured urban traffic jam-free scenario class algorithm, whether a designed operation range of the junction scenario class is matched is determined based on designed operation range determining information; and (1) if the designed operation range of the junction scenario class is matched, an instruction for switching to the junction scenario class is sent, or (2) if the designed operation range of the junction scenario class is not matched, whether a designed operation range for the structured urban traffic jam-free scenario class is matched is determined, and (a) if the designed operation range for the structured urban traffic jam-free scenario class is matched, an instruction for maintaining the structured urban traffic jam-free scenario class and information about failing to switch a scenario class to the junction scenario class are sent, or (b) if the designed operation range for the structured urban traffic jam-free scenario class is not matched, fault alert information and manual takeover request information are sent.

(6) If the recognized scenario class is the junction scenario class, and a running intelligent driving algorithm is a junction scenario class algorithm, whether a designed operation range of the junction scenario class is matched is determined based on designed operation range determining information, and if the designed operation range of the junction scenario class is matched, an instruction for maintaining the junction scenario class is sent, or if the designed operation range of the junction scenario class is not matched, fault alert information and manual takeover request information are sent.

(7) Whether there is instruction information for terminating the intelligent driving system is determined based on a driver or cloud operation intention.

If there is instruction information for terminating the intelligent driving system, an instruction for releasing control rights over systems such as an accelerator system, a gear system, a steering wheel system, and a brake system is sent to the proactive vehicle execution module, and the instruction is sent to the driver through an HMI. Alternatively, if there is no instruction information for terminating the intelligent driving system, whether the driver is intended to switch the driving system to a scenario class is determined, and if the driver is intended to switch the driving system to the scenario class, a corresponding algorithm for switching to the scenario class is sent to a perception fusion operator selection module and a decision control operator module, or if the driver is not intended to switch the driving system to the scenario class, information from a scenario class switching determining module is received.

When the information is an instruction for switching to the junction scenario class, an intelligent driving algorithm corresponding to the instruction for switching to the junction scenario class is sent.

When the information is sending an instruction for maintaining the structured urban traffic jam-free scenario class and information about failing to switch a scenario class to the junction scenario class, an intelligent driving algorithm corresponding to the instruction for maintaining the structured urban traffic jam-free scenario class is sent, and the information about failing to switch a scenario class to the junction scenario class is sent to an interaction module.

When the information is fault alert information and manual takeover request information, fault alert information and a manual takeover request are sent. When a manual takeover feedback (vehicle status parameter information from the vehicle execution module) is received, an instruction for releasing control rights over systems such as an accelerator system, a gear system, a steering wheel system, and a brake system is sent, and the instruction is sent to the driver through the HMI, or when no manual takeover feedback is received within a period of time, the vehicle is controlled to perform safe pullover (control instructions are sent to systems such as an accelerator system, a gear system, a steering wheel system, and a brake system).

When the information is an instruction for maintaining the junction scenario class, an intelligent driving algorithm corresponding to the instruction for maintaining the junction scenario class is sent.

It can be understood that to implement the foregoing functions, the vehicle includes a hardware structure and/or software module to perform each corresponding function. A person skilled in the art should easily be aware that in combination with the units, algorithms, and steps in the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, functional module division of the vehicle for performing the foregoing intelligent driving method or the intelligent driving system may be performed based on the foregoing method example. For example, the functional modules may be obtained based on functions, or two or more functions may be integrated into one processing module. The integrated module may be implemented in a form of hardware, or may be implemented in a form of a software functional module. It should be noted that in this embodiment of this application, module division is an example, and is merely logical function division. In actual implementation, another division manner may be used.

In an implementation provided in this application, in a scenario switching process, a plurality of scenario switching modes may be preset for interaction between an intelligent driving system of a vehicle and a driver. The driver may select one of the plurality of scenario switching modes. The possible scenario switching modes provided on the vehicle are as follows.

First mode: notification-only switching mode. In an intelligent driving vehicle with a high degree of automation, the notification-only switching mode may be provided. In this mode, when determining that scenario switching is needed, the vehicle may proactively perform scenario switching without confirmation of a driver. When performing scenario switching, the vehicle may notify, through a human machine interface 250 or a voice, the driver that the vehicle has performed scenario switching. Further, the driver may also set that the vehicle does not notify scenario switching information.

In a standard formulated by the Society of Automotive Engineers (SAE) International, five levels of self-driving are made. Level 4 (L4) corresponds to a high degree of automation, to be more specific, a self-driving system completes all driving operations, and a driver does not have to respond to a system request. In practice, a vehicle can complete most tasks that can be completed by a human driver in a well-mapped area. Level 5 (L5) corresponds to complete automation, to be more specific, a self-driving system can complete all driving operations on unlimited roads and in unlimited conditions, and a driver only takes over a vehicle in a necessary situation. Generally, in vehicles on which L4 and L5 are implemented, the vehicles can implement self-driving in most cases without intervention of a driver, such that the notification-only switching mode may be provided.

Second mode: default agree mode. For an intelligent driving vehicle without a sufficiently high degree of automation, the default agree mode may be provided. In this mode, when determining that scenario switching is needed, the vehicle first sends a request to a driver through a human machine interface or a voice. The driver may respond to the request, and instructs the vehicle to perform scenario switching; or when the driver does not respond to the request within a preset time, the vehicle considers, by default, that the driver agrees the scenario switching request. In this case, the vehicle performs driving scenario switching. For example, at Level 3 (L3) of self-driving, a self-driving system of a vehicle completes all driving operations, a driver provides a proper response based on a request of the self-driving system of the vehicle, and takes over control rights of the vehicle any time. Generally, in a vehicle in which L3 is implemented, the default agree mode may be provided.

Third mode: default reject mode. For an intelligent driving vehicle with a low degree of automation, the default reject mode may be provided. In this case, when determining that scenario switching is needed, the vehicle first sends a request to a driver through a human machine interface or a voice. For example, the vehicle suggests, based on information such as feature parameters at a current moment, to select a first driving scenario class in a scenario feature library as a driving scenario of the vehicle, and may send a request to ask for confirmation of the driver. If the driver does not respond to the request within a preset time, the vehicle considers, by default, that the driver rejects the scenario switching request. In this case, the vehicle maintains a driving scenario at a previous moment. If a current designed operation range of the vehicle does not match a designed operation range corresponding to the driving scenario at the previous moment, the vehicle sends fault alert information, and requests the driver to take over the vehicle. When a preset time (for example, three seconds) elapses after the fault alert information is sent, the intelligent driving system determines whether the driver has taken over the vehicle; and if determining that the driver has taken over the vehicle, sends an operation instruction for indicating driving right release, and sends a control right release notification to the driver, or if determining that the driver has not taken over the vehicle within the preset time, sends an operation instruction for indicating safe pullover, to ensure driving safety.

It should be noted that the foregoing three scenario switching modes are only examples used to describe the following: a plurality of vehicle-driver interaction manners may be provided in a scenario switching process in this application, and constitute no limitation on this application. Similarly, in the foregoing descriptions, a correspondence between a self-driving level of a vehicle and a possible switching mode that may be provided on the vehicle is merely a possible implementation, and constitutes no limitation on this application.

Figure 7A:
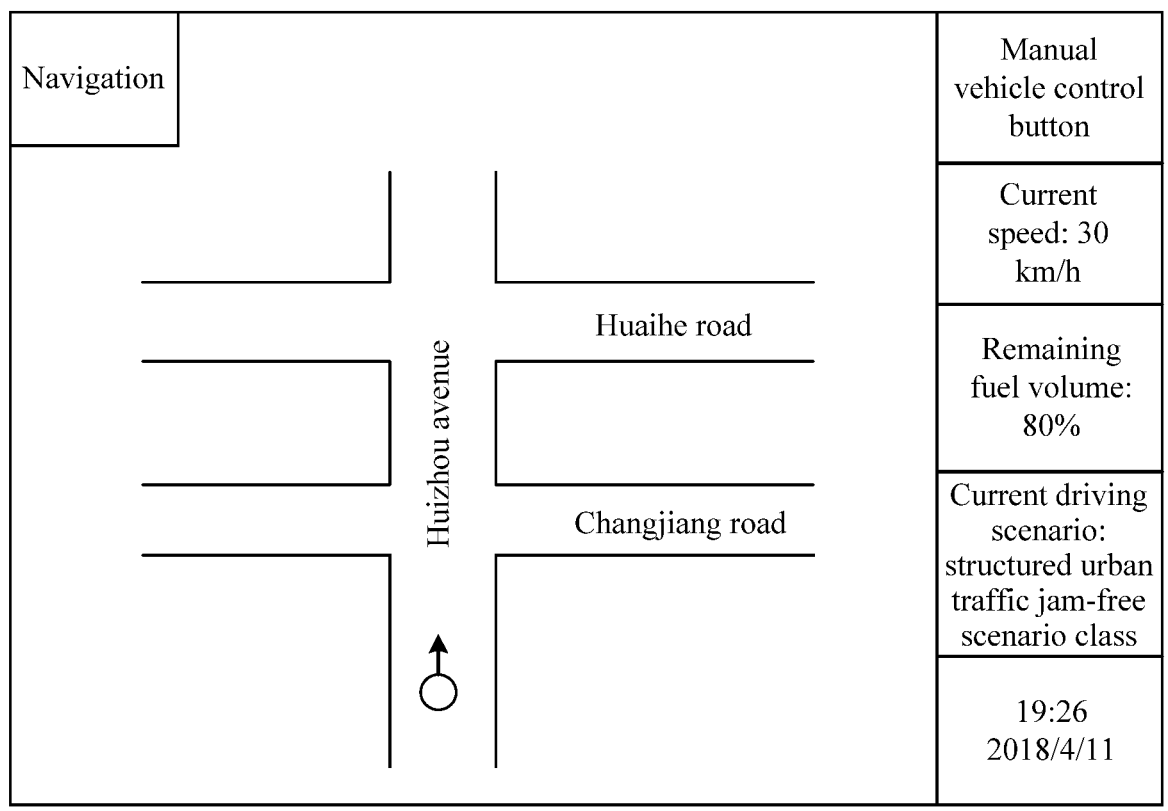
FIG. 7A is a schematic diagram of a human machine interface according to an embodiment of this application.

FIG. 7A is a schematic diagram of a human machine interface according to an embodiment of this application. As shown in FIG. 7A, the human machine interface may include the following parts: a navigation part configured to indicate information such as a map of an area in which a vehicle is currently located, a specific location of the vehicle, and a driving direction, where as shown in the figure, the vehicle is driving northward along Huizhou avenue; a manual vehicle control button configured to transfer a driving right from the vehicle to a driver when the driver touches this button, where although a self-driving technology is used in a vehicle, vehicle takeover rights are usually granted to a driver, and therefore a manual vehicle control button may be set on the human machine interface to control driving right transfer. Similarly, the manual vehicle control button may be also set as follows: if the driver is currently manually controlling driving of the vehicle, when the driver touches the manual vehicle control button, the driving right is transferred to the vehicle to start self-driving; and a status bar may be further set for the manual vehicle control button to indicate whether the vehicle is currently in a self-driving state or a driver manual control state. The human machine interface may also include: a speed display part configured to display a current speed of the vehicle; a remaining fuel volume display part configured to display a current remaining fuel volume of the vehicle, where similarly, when the vehicle is powered by electricity or a combination of electricity and fuel, the remaining fuel volume display part may correspondingly display current remaining energy of the vehicle or a distance that the vehicle is expected to travel further; a driving scenario display part configured to display a current driving scenario of the vehicle, where in this application, the vehicle can choose to use a different driving scenario based on feature parameters of the vehicle, and therefore the current driving scenario of the vehicle may be displayed on the human machine interface for the driver to know. Further, the driving scenario part may be also set as follows: the driver can manually change the current driving scenario by tapping this part of screen on the human machine interface. The human machine interface may further include a time display part configured to display a current time of the vehicle.

FIG. 7B is a schematic diagram of a human machine interface in scenario switching according to an embodiment of this application. When a vehicle drives northward along Huizhou avenue, as shown in FIG. 6A, the vehicle uses a structured urban traffic jam-free scenario class. However, when the vehicle drives to a junction of Huizhou avenue and Changjiang road, as shown in FIG. 6B, the vehicle determines, using the foregoing method, to switch a current scenario from the structured urban traffic jam-free scenario class to a junction scenario class. The human machine interface may further include a notification display part, configured to display information that the driver needs to know. For example, as shown in FIG. 7B, information may be displayed in the notification display part to notify the driver that the driving scenario of the vehicle is about to be switched to the junction scenario class (in this case, an accompanying voice or prompt sound may be further provided to notify the driver). The human machine interface shown in FIG. 7B is applicable to the foregoing notification-only switching mode.

Figure 7C:
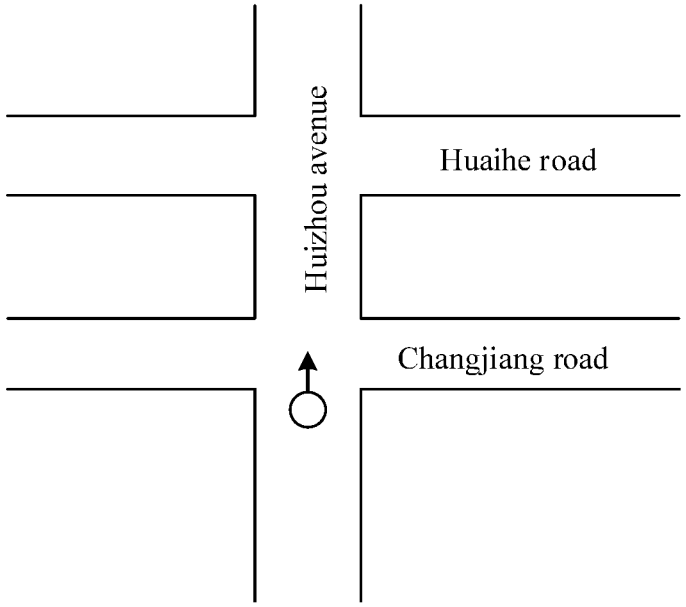
FIG. 7C is a schematic diagram of another human machine interface according to an embodiment of this application.

FIG. 7C is a schematic diagram of another human machine interface in scenario switching according to an embodiment of this application. Similar to FIG. 7B, when a vehicle drives to a junction of Huizhou avenue and Changjiang road, the vehicle determines, using the foregoing method, to switch a current scenario from a structured urban traffic jam-free scenario class to a junction scenario class. A notification display part on the human machine interface prompts that the driving scenario is about to be switched to the junction scenario class, and provides an OK button and a Cancel button for a driver to select (in this case, an accompanying voice or prompt sound may be further provided to notify the driver). The human machine interface shown in FIG. 7C is applicable to the foregoing default agree mode and the default reject mode. When the default agree mode is used, and the notification display part on the human machine interface prompts scenario switching and the driver does not perform selection within a preset time, it is considered, by default, that the driver allows the vehicle to switch a scenario. When the default reject mode is used, and the notification display part on the human machine interface prompts scenario switching and the driver does not perform selection within a preset time, it is considered, by default, that the driver rejects the vehicle to switch a scenario.

Figure 7D:
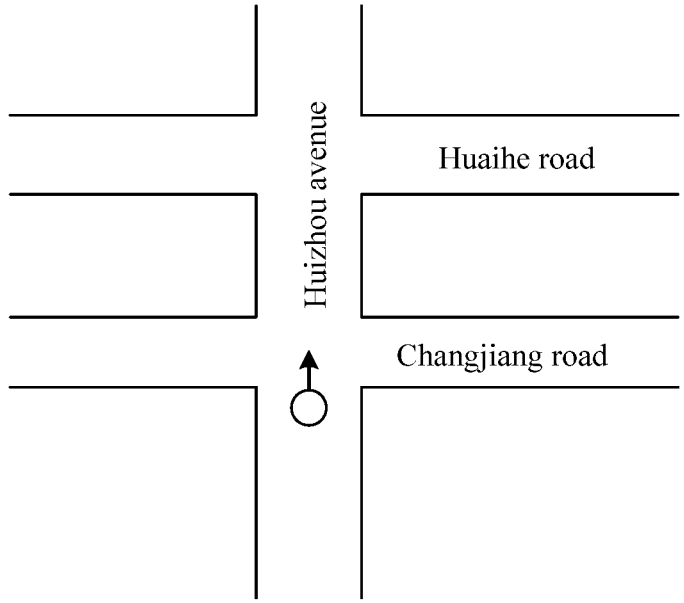
FIG. 7D is a schematic diagram of another human machine interface according to an embodiment of this application.

FIG. 7D is a schematic diagram of another human machine interface according to an embodiment of this application. Vehicle-driver interaction may be implemented in a voice manner or another manner on the human machine interface, and therefore in a notification display part, a possible voice instruction may be used to remind a current driver. For example, as shown in FIG. 7D, the notification display part may prompt that you may say "switch to an xxx scenario class" and "release driving rights of the vehicle". Based on the prompt of the notification display part, the driver may manually switch a driving scenario or transfer driving rights of the vehicle, or perform another operation in a voice interaction manner, thereby improving human-machine efficiency.

It should be noted that the foregoing provided schematic diagram of the human machine interface is merely an example used to describe human-machine interaction in vehicle scenario switching, and constitutes no limitation on the protection scope of this application.

Figure 8:
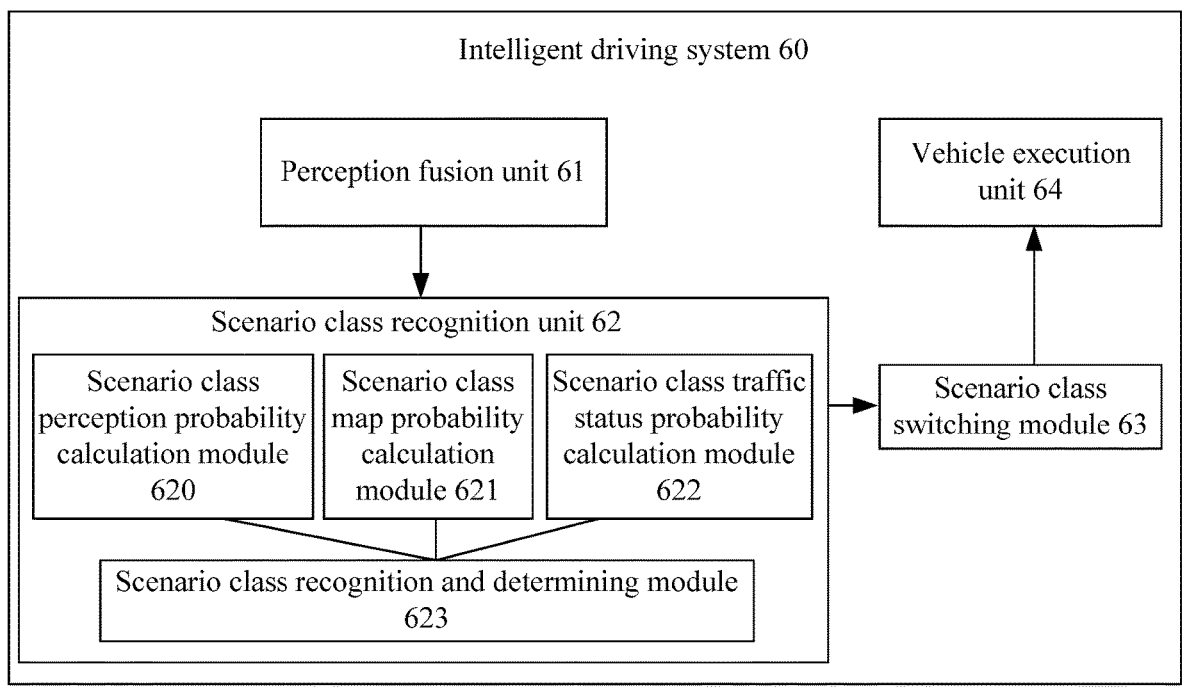
FIG. 8 is a schematic compositional diagram of another intelligent driving system according to an embodiment of this application.

FIG. 8 shows an intelligent driving system according to an embodiment of this application. The intelligent driving system may be a vehicle or may be included in a vehicle. As shown in FIG. 8, the intelligent driving system 60 may include a perception fusion unit 61, a scenario class recognition unit 62, and a scenario class switching module 63, and may further include a vehicle execution unit 64.

The perception fusion unit 61 is configured to obtain feature parameters of a vehicle at a current moment and a road attribute of a driving scenario of the vehicle in a preset future time period. For example, the perception fusion unit 61 may perform step 301.

The scenario class recognition unit 62 is configured to: compare the feature parameters of the vehicle at the current moment with feature parameters of a standard scenario in a scenario feature library; compare the road attribute of the driving scenario of the vehicle in the preset future time period with a road attribute of the standard scenario in the scenario feature library; determine a total similarity of each scenario class in the scenario feature library to a driving scenario of the vehicle at the current moment based on comparing results; and determine, as the driving scenario at the current moment, a first scenario class with a highest total similarity in N scenario classes, where the scenario feature library includes the N scenario classes, each scenario class corresponds to M standard scenarios, each standard scenario corresponds to feature parameters, N is an integer greater than or equal to 1, and M is an integer greater than or equal to 1. For example, the scenario class recognition unit 62 may perform step 302 and step 303.

The scenario class switching module 63 is configured to control a driving status of the vehicle based on the determining result. For example, the scenario class slice module 63 may perform step 304.

As shown in FIG. 8, the scenario class recognition unit 62 may include a scenario class perception probability calculation module 620 configured to: compare structured semantic information at the current moment with structured semantic information of the standard scenario in the scenario feature library, to obtain a first similarity of the standard scenario; and perform combined calculation on first similarities of all standard scenarios belonging to a scenario class, to obtain a first probability of the scenario class, where for example, the scenario class perception probability calculation module 620 may perform the process shown in FIG. 4A. The scenario class recognition unit 62 may also include a scenario class map probability calculation module 621 configured to: compare a road attribute at the current moment with the road attribute of the standard scenario in the scenario feature library, to obtain a second similarity of the standard scenario; perform combined calculation on second similarities of all the standard scenarios belonging to the scenario class, to obtain a second probability of the scenario class; compare the road attribute of the driving scenario of the vehicle in the preset future time period with the road attribute of the standard scenario in the scenario feature library, to obtain a third similarity of the standard scenario; and perform combined calculation on third similarities of all the standard scenarios belonging to the scenario class, to obtain a third probability of the scenario class, where for example, the scenario class map probability calculation module 621 may perform the process shown in FIG. 4B. The scenario class recognition unit 62 may also include a scenario class traffic status probability calculation module 622 configured to: compare a traffic status spectrum at the current moment with a traffic status spectrum of the standard scenario in the scenario feature library, to obtain a fourth similarity of the standard scenario; and perform combined calculation on fourth similarities of all the standard scenarios belonging to the scenario class, to obtain a fourth probability of the scenario class, where for example, the scenario class traffic status probability calculation module 622 may perform the process shown in FIG. 4C. The scenario class recognition unit 62 may also include a scenario class recognition and determining module 623 configured to obtain a total similarity of the scenario class based on the first probability, the second probability, the third probability, and the fourth probability of the scenario class.

It should be noted that all related content of the steps in the foregoing method embodiments can be referred in function descriptions of corresponding functional modules. Details are not described herein again. The intelligent driving system provided in this embodiment of this application is configured to perform the foregoing intelligent driving method, and therefore can have same effects as the foregoing intelligent driving method.

In another feasible implementation, the intelligent driving system 60 may include a processing module, a communications module, and a proactive vehicle execution unit. The perception fusion unit 61, the scenario class recognition unit 62, and the scenario class switching module 63 may be integrated into the processing module. The processing module is configured to control and manage an action of the intelligent driving system 60. For example, the processing module is configured to support the communications apparatus 11 in performing step 301, step 302, step 303, step 304, and the like, and other procedures of the technology described in this specification. The communications module is configured to support the intelligent driving system 60 in communicating with a driver, and may be a human machine interface. Further, the intelligent driving system 60 may further include a storage module, configured to store program code and an intelligent driving algorithm of the intelligent driving system 60.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module may be a human machine interface or the like. The storage module may be a memory. When the processing module is a processor, the communications module is a human machine interface, and the storage module is a memory, the intelligent driving system 60 shown in FIG. 8 may be the intelligent driving system shown in FIG. 2.

Figure 9:
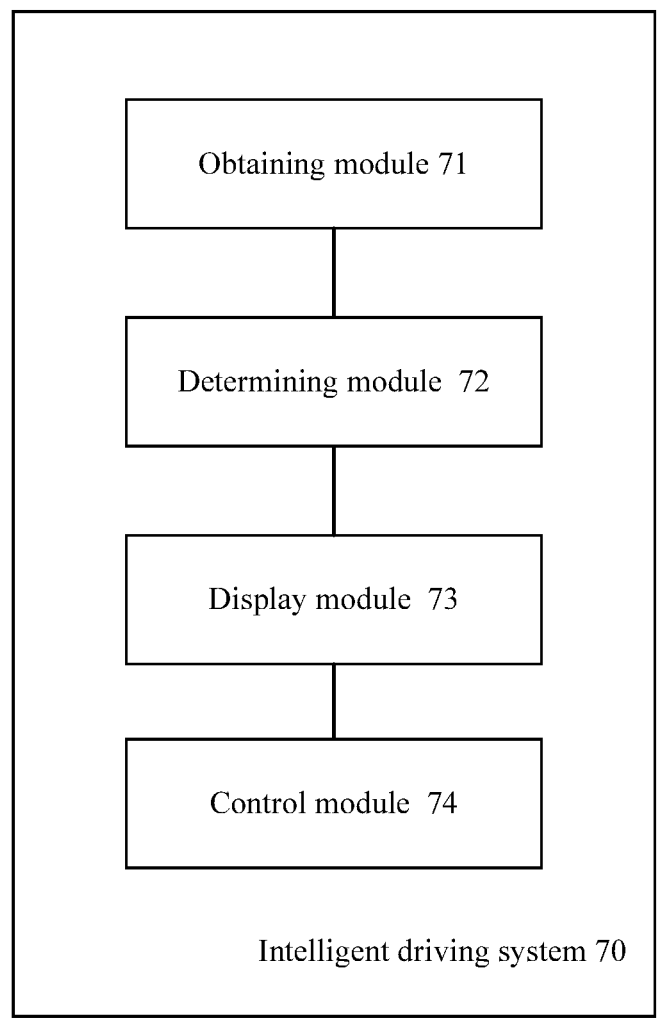
FIG. 9 is a schematic compositional diagram of another intelligent driving system according to an embodiment of this application.

FIG. 9 is an example compositional diagram of another intelligent driving system according to an embodiment of this application.

As shown in FIG. 9, an intelligent driving system 70 includes an obtaining module 71, a determining module 72, a display module 73, and a control module 74. The obtaining module 71 is configured to obtain feature parameters of a vehicle at a first time and a road attribute of a driving scenario of the vehicle in a preset future time period after the first time, where the feature parameters include structured semantic information, a road attribute, and a traffic status spectrum. The determining module 72 is configured to select a first driving scenario class in a scenario feature library based on the feature parameters of the vehicle at the first time and the road attribute of the driving scenario of the vehicle in the preset future time period. The display module 73 is configured to: display a first prompt, where the first prompt is used to indicate a driver that a driving scenario of the vehicle at the first time is switched to the first driving scenario class, and receive a first instruction, where the first instruction corresponds to the first indicator, and is used to instruct to switch from the driving scenario of the vehicle at the first time to the first scenario class. The control module 74 is configured to control a driving status of the vehicle based on the first driving class.

In a possible implementation, when selecting the first driving scenario class in the scenario feature library, the determining module 72 is configured to: compare the feature parameters of the vehicle at the first time with road attributes of feature parameters of a standard scenario in the scenario feature library; determine a total similarity of each scenario class in the scenario feature library to a driving scenario of the vehicle at a current moment based on a comparing result, where each scenario feature library includes N scenario classes, each scenario class corresponds to M standard scenarios, and both N and M are positive integers; and determine, as the driving scenario at the first time, a first scenario class with a highest total similarity in the N scenario classes.

In a possible implementation, after the driving status of the vehicle is controlled based on the first driving scenario class, the determining module 72 is further configured to select a second driving scenario class in the scenario feature library as a driving scenario at a second time. The display module 73 is further configured to display a second prompt, where the second prompt is used to instruct to switch from the driving scenario of the vehicle at the second time to the second driving scenario, and when no second instruction is received within a preset time, instruct the control module 74 to keep controlling, based on the first driving scenario class, the driving status of the vehicle, where the second instruction corresponds to the second prompt, and is used to instruct to switch from the current driving scenario of the vehicle to the second driving scenario class.

In a possible implementation, after no second response is received within the preset time, the determining module 71 is further configured to determine that a designed operation range of the vehicle at the second time does not match a designed operation range corresponding to the first scenario class. The display module 73 is further configured to send fault alert information.

In a possible implementation, after the fault alert information is sent, the determining module 71 is further configured to determine whether the driver has taken over the vehicle. The display module 73 is further configured to: if the determining module 71 determines that the driver has taken over the vehicle, send an operation instruction for indicating driving right release, and send a release notification to the driver, or if the determining module 71 determines that the driver has not taken over the vehicle, send an operation instruction for indicating safe pullover.

All or some of the foregoing embodiments may be implemented by software, hardware, firmware, or any combination thereof. When a software program is used for implementation, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable system. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "including" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to features and the embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clear that, various modifications and variations to this application can be made without departing from the spirit and scope of this application. This application is intended to cover these modifications and variations of this application provided that they fall within the scope of protection defined by the following claims and their equivalent technologies.

What is claimed is:

1. An intelligent driving method applied to an intelligent driving system comprising a processor and a memory coupled to the processor, comprising:
    obtaining current feature parameters of a vehicle at a current moment and a future road attribute of a driving scenario of the vehicle in a preset future time period, wherein the current feature parameters comprise structured semantic information, a road attribute, and a traffic status spectrum;
    performing a first comparison of the current feature parameters with standard feature parameters of a standard scenario in a scenario feature library;
    performing a second comparison of the future road attribute of the driving scenario with a standard road attribute of the standard scenario;
    determining a total similarity of each scenario class in the scenario feature library to a current driving scenario of the vehicle at the current moment based on the first comparison and the second comparison, wherein the scenario feature library comprises N scenario classes, wherein each scenario class corresponds to M standard scenarios, wherein each standard scenario corresponds to the standard feature parameters, wherein N is an integer greater than or equal to 1, and wherein M is an integer greater than or equal to 1;
    determining, as the current driving scenario at the current moment, a first scenario class with a highest total similarity in the N scenario classes;
    determining whether the first scenario class is the same as a previous scenario class at a previous moment;
    responsive to determining that the first scenario class is the same as the scenario class at the previous moment, determining whether a current designed operation range of the vehicle matches a designed operation range corresponding to the first scenario class;
    maintaining a current driving status when the current designed operation range of the vehicle matches the designed operation range corresponding to the first scenario class; and
    sending fault alert information when the current designed operation range of the vehicle does not match the designed operation range corresponding to the first scenario class.

2. The intelligent driving method of claim 1, wherein for any scenario class in the scenario feature library, comparing the current feature parameters with the standard feature parameters, comparing the future road attribute with the standard road attribute, and determining the total similarity of the scenario class based on comparing results comprises:

obtaining a first similarity of the standard scenario by comparing the structured semantic information at the current moment with additional structured semantic information of the standard scenario;

obtaining a first probability of the scenario class by performing combined calculation on first similarities of all standard scenarios belonging to the scenario class;

comparing a current road attribute at the current moment with the standard road attribute to obtain a second similarity of the standard scenario;

obtaining a second probability of the scenario class by performing combined calculation on second similarities of all the standard scenarios belonging to the scenario class;

obtaining a third similarity of the standard scenario by comparing the future road attribute with the standard road attribute;

obtaining a third probability of the scenario class by performing combined calculation on third similarities of all the standard scenarios belonging to the scenario class;

obtaining a fourth similarity of the standard scenario by comparing the traffic status spectrum at the current moment with another traffic status spectrum of the standard scenario in the scenario feature library;

obtaining a fourth probability of the scenario class by performing combined calculation on fourth similarities of all the standard scenarios belonging to the scenario class; and obtaining the total similarity of the scenario class based on the first probability, the second probability, the third probability, and the fourth probability of the scenario class.

3. The intelligent driving method of claim 2, wherein before comparing the current feature parameters with standard feature parameters and comparing the future road attribute with the standard road attribute, the intelligent driving method further comprises setting, to 0, a similarity of a standard scenario without real-time structured semantic information in the scenario feature library.

4. The intelligent driving method of claim 1, further comprising:

determining, when the first scenario class is different from the scenario class at the previous moment, whether the current designed operation range of the vehicle matches the designed operation range corresponding to the first scenario class; and switching, when the current designed operation range of the vehicle matches the designed operation range corresponding to the first scenario class, the vehicle from a current driving status to a driving status corresponding to the first scenario class.

5. The intelligent driving method of claim 1, further comprising:

determining, when the current designed operation range of the vehicle does not match the designed operation range corresponding to the first scenario class, whether the current designed operation range of the vehicle matches a designed operation range corresponding to the scenario class at the previous moment;

sending scenario class switching failure information and maintaining the current driving status when the current designed operation range of the vehicle matches the designed operation range corresponding to the scenario class at the previous moment; and sending the fault alert information when the current designed operation range of the vehicle does not match the designed operation range corresponding to the scenario class at the previous moment.

6. The intelligent driving method of claim 1, wherein after sending the fault alert information, the intelligent driving method further comprises:

determining whether a driver has taken over the vehicle;

sending a first operation instruction to a proactive vehicle execution processor of the vehicle and sending a release notification to the driver when the driver has taken over the vehicle, wherein the first operation instruction indicates a driving right release; and sending a second operation instruction to a proactive vehicle execution processor when the driver has not taken over the vehicle, wherein the second operation instruction indicates a safe pullover.

7. The intelligent driving method of claim 1, further comprising:

obtaining an intelligent driving instruction instructing whether to terminate intelligent driving of the vehicle;

controlling the vehicle to perform intelligent driving if the intelligent driving instruction instructs the vehicle to perform intelligent driving; and sending an operation instruction to the proactive vehicle execution processor and sending a release notification to a driver of the vehicle when the intelligent driving instruction instructs termination of intelligent driving of the vehicle, wherein the operation instruction indicates a driving right release.

8. The intelligent driving method of claim 1, wherein the structured sematic information comprises information about objects around the vehicle.

9. The intelligent driving method of claim 1, wherein the traffic status spectrum comprises a running status of the vehicle and a running status of a traffic participant vehicle.

10. An intelligent driving system, comprising:

a perception fusion receiver configured to obtain current feature parameters of a vehicle at a current moment and a future road attribute of a driving scenario of the vehicle in a preset future time period, wherein the current feature parameters comprise structured semantic information, a road attribute, and a traffic status spectrum; and a scenario class recognition processor configured to:

perform a first comparison of the current feature parameters with standard feature parameters of a standard scenario in a scenario feature library;

perform a second comparison of the future road attribute with a standard road attribute of the standard scenario in the scenario feature library;

determine a total similarity of each scenario class in the scenario feature library to a current driving scenario of the vehicle at the current moment based on the first comparison and the second comparison, wherein the scenario feature library comprises N scenario classes, wherein each scenario class corresponds to M standard scenarios, wherein each standard scenario corresponds to the standard feature parameters, wherein N is an integer greater than or equal to 1, and wherein M is an integer greater than or equal to 1;

determine, as the current driving scenario at the current moment, a first scenario class with a highest total similarity in the N scenario classes;

determine whether the first scenario class is the same as a previous scenario class at a previous moment;

determine, when the first scenario class is the same as the previous scenario class, determine whether a current designed operation range of the vehicle matches a designed operation range corresponding to the first scenario class;

maintain, when the current designed operation range of the vehicle matches the designed operation range corresponding to the first scenario class, a current driving status; and send, when the current designed operation range of the vehicle does not match the designed operation range corresponding to the first scenario class, fault alert information.

11. The intelligent driving system of claim 10, wherein the scenario class recognition processor comprises:

a scenario class perception probability calculation processor configured to:
  obtain a first similarity of the standard scenario by comparing the structured semantic information with additional structured semantic information of the standard scenario; and
  obtain a first probability of the scenario class by performing combined calculation on first similarities of all standard scenarios belonging to the scenario class;

a scenario class map probability calculation procesor configured to:
  obtain a second similarity of the standard scenario by comparing a current road attribute with the standard road attribute;
  obtain a second probability of the scenario class by performing combined calculation on second similarities of all the standard scenarios belonging to the scenario class;
  obtain a third similarity of the standard scenario by comparing the future road attribute with the standard road attribute; and
  obtain a third probability of the scenario class by performing combined calculation on third similarities of all the standard scenarios belonging to the scenario class;

a scenario class traffic status probability calculation processor configured to:
  obtain a fourth similarity of the standard scenario by comparing the traffic status spectrum with another traffic status spectrum of the standard scenario; and
  obtain a fourth probability of the scenario class by performing combined calculation on fourth similarities of all the standard scenarios belonging to the scenario class; and a scenario class recognition and determining processor configured to obtain the total similarity of the scenario class based on the first probability, the second probability, the third probability, and the fourth probability of the scenario class.

12. The intelligent driving system of claim 11, wherein the scenario class recognition processor is further configured such that before comparing the current feature parameters with the standard feature parameters and comparing the future road attribute with the standard road attribute of the standard scenario in the scenario feature library, scenario class recognition processor sets, to 0, a similarity of a standard scenario without real-time structured semantic information in the scenario feature library.

13. The intelligent driving system of claim 10, wherein the scenario class switching processor is further configured to:

determine, when the first scenario class is different from the previous scenario class, whether the current designed operation range of the vehicle matches the designed operation range corresponding to the first scenario class; and switch, when the current designed operation range of the vehicle matches the designed operation range corresponding to the first scenario class, the vehicle from a current driving status to a driving status corresponding to the first scenario class; otherwise, determine whether the current designed operation range of the vehicle matches a second designed operation range corresponding to the scenario class at the previous moment; and send scenario class switching failure information and maintain a current driving status when the current designed operation range of the vehicle matches the second designed operation range; or send fault alert information when the current designed operation range of the vehicle does not match the designed operation range corresponding to the scenario class at the previous moment.

14. The intelligent driving system of claim 10, further comprising a proactive vehicle execution processor, wherien the scenario class switching processor is further configured to:

determine, after sending the fault alert information, whether a driver has taken over the vehicle; and send, to the proactive vehicle execution processor, an operation instruction for indicating safe pullover when the driver has taken over the vehicle; otherwise, send, to the proactive vehicle execution processor, another operation instruction for indicating driving right release; and send a release notification to the driver.

15. The intelligent driving system of claim 10, wherein the scenario class switching processor is further configured to:

obtain an intelligent driving instruction, wherein the intelligent driving instruction is for instructing whether to terminate intelligent driving of the vehicle; and control, when the intelligent driving instruction instructs the vehicle to perform intelligent driving, the vehicle to perform intelligent driving; otherwise, send, when the intelligent driving instruction instructs the vehicle to terminate intelligent driving, send, to a proactive vehicle execution unit of the vehicle, an operation instruction for indicating driving right release; and send a release notification to a driver.

16. An intelligent driving method implemented in an intelligent driving system on a vehicle, the method comprising:

obtaining first feature parameters of the vehicle at a first time and a future road attribute of a future driving scenario of the vehicle in a preset future time period after the first time, wherein the first feature parameters comprise structured semantic information, a road attribute, and a traffic status spectrum;

selecting a first driving scenario class in a scenario feature library based on the first feature parameters and the future road attribute;

displaying a first prompt, wherein the first prompt prompts a driver that a first driving scenario of the vehicle at the first time is switched to the first driving scenario class;

receiving a first instruction corresponding to the first prompt, wherien the first instruction instructs switching from the first driving scenario to the first driving scenario class;

controlling a driving status of the vehicle based on the first driving scenario class;

selecting a second driving scenario class in the scenario feature library as a second driving scenario at a second time;

displaying a second prompt to request switching from the second driving scenario to the second driving scenario class; and keep controlling the driving status when a second instruction is not received within a preset time, wherein the second instruction is to instruct switching from a current driving scenario of the vehicle to the second driving scenario class.

17. The intelligent driving method of claim 16, wherein selecting the first driving scenario class comprises:

performing a first comparison of the first feature parameters of the vehicle at the first time with standard feature parameters of a standard scenario in the scenario feature library;

performing a second comparison of the future road attribute with a standard road attribute of the standard scenario in the scenario feature library;

determining a total similarity of each scenario class in the scenario feature library to a current driving scenario of the vehicle at a current moment based on the first comparison and the second comparison, wherein the scenario feature library comprises N scenario classes, wherein each scenario class corresponds to M standard scenarios, and wherein both N and M are positive integers; and determining, as the first driving scenario at the first time, a first scenario class with a highest total similarity in the N scenario classes.

18. The intelligent driving method of claim 16, wherein when the second instruction is not received within the preset time, the intelligent driving method further comprises:

determining that a designed operation range of the vehicle at the second time does not match a designed operation range corresponding to a first scenario class; and sending fault alert information.

19. The intelligent driving method of claim 18, wherein after sending the fault alert information, the intelligent driving method further comprises:

determining whether the driver has taken over the vehicle; and sending an operation instruction for indicating safe pull-over when it is determined that the driver has not taken over the vehicle; otherwise, sending an operation instruction for indicating driving right release; and sending a release notification to the driver.

20. The intelligent driving method of claim 18, wherein the structured sematic information comprises information about objects around the vehicle.

* * * * *